United States Patent
Liu et al.

(10) Patent No.: US 10,951,276 B2
(45) Date of Patent: *Mar. 16, 2021

(54) CHANNEL MEASUREMENT AND FEEDBACK METHOD, NETWORK DEVICE, AND SYSTEM

(71) Applicant: Huawei Technologies Co., Ltd., Shenzhen (CN)

(72) Inventors: Kunpeng Liu, Beijing (CN); Jianghua Liu, Beijing (CN); Leiming Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/567,882

(22) Filed: Sep. 11, 2019

(65) Prior Publication Data
US 2020/0007198 A1  Jan. 2, 2020

Related U.S. Application Data

(63) Continuation of application No. 15/630,303, filed on Jun. 22, 2017, now Pat. No. 10,454,537, which is a (Continued)

(51) Int. Cl.
*H04B 7/0417* (2017.01)
*H04B 7/06* (2006.01)
(Continued)

(52) U.S. Cl.
CPC ........ *H04B 7/0417* (2013.01); *H04B 7/0452* (2013.01); *H04B 7/0456* (2013.01); (Continued)

(58) Field of Classification Search
CPC .... H04W 72/12; H04L 5/0057; H04L 5/0053; H04L 5/0023
See application file for complete search history.

(56) References Cited

U.S. PATENT DOCUMENTS 10,454,537 B2 * 10/2019 Liu ..................... H04L 1/20
2012/0207935 A1    8/2012 Shukla
(Continued)

FOREIGN PATENT DOCUMENTS

CN    101753186 A    6/2010
CN    102468932 A    5/2012
(Continued)

OTHER PUBLICATIONS

"Motivation for Enhanced MU-MI MO and Network Assisted Interference Cancellation," 3GPP Draft; RP-141405, XP050783738 3rd Generation Partnership Project (3GPP), Mobile Competence Centre; 650, Route Des Lucioles; F-06921 Sophia-Antipolis Cedex, France vol. TSG RAN No. Edinburgh, United Kingdom, (Sep. 2, 2014).

(Continued)

*Primary Examiner* — Jamal Javaid
(74) *Attorney, Agent, or Firm* — Leydig, Voit & Mayer, Ltd.

(57) ABSTRACT

Embodiments of the present invention provide a channel measurement and feedback method, a network device, and a system, and relate to the field of communications technologies. The method includes: receiving, by a first network device, pilot port configuration information sent by a second network device, where the pilot port configuration information is used to describe at least two pilot ports; measuring, by using the at least two pilot ports, a pilot signal sent by the second network device, and determining first information, where the first information includes at least one of second information of the first network device or third information of a third network device when it is assumed that the first network device and the third network device communicate with the second network device by performing spatial multiplexing on a same time frequency resource.

17 Claims, 8 Drawing Sheets

Related U.S. Application Data continuation of application No. PCT/CN2014/094586, filed on Dec. 23, 2014.

(51) Int. Cl.
*H04B 7/0452* (2017.01)
*H04L 1/20* (2006.01)
*H04B 7/0456* (2017.01)
*H04L 5/00* (2006.01)
*H04W 24/08* (2009.01)

(52) U.S. Cl.
CPC ............ *H04B 7/0626* (2013.01); *H04L 1/20* (2013.01); *H04L 5/0048* (2013.01); *H04L 5/0057* (2013.01); *H04W 24/08* (2013.01); *H04L 5/005* (2013.01); *H04L 5/0051* (2013.01); *H04L 5/0094* (2013.01); *Y02D 30/50* (2020.08)

(56) References Cited

U.S. PATENT DOCUMENTS

| | | | | |
|---|---|---|---|---|
| 2012/0307935 | A1* | 12/2012 | Zhang | H04B 7/0417 375/295 |
| 2013/0308488 | A1* | 11/2013 | Tong | H04B 7/0452 370/252 |
| 2014/0226509 | A1 | 8/2014 | Ko et al. | |
| 2017/0085303 | A1 | 3/2017 | Chen et al. | |

FOREIGN PATENT DOCUMENTS

| | | |
|---|---|---|
| CN | 102594526 A | 7/2012 |
| CN | 102916785 A | 2/2013 |
| CN | 103259615 A | 8/2013 |
| CN | 103580812 A | 2/2014 |
| CN | 103716116 A | 4/2014 |
| CN | 104144027 A | 11/2014 |
| CN | 104202073 A | 12/2014 |
| KR | 20050049508 A | 5/2005 |
| WO | 2014074914 A1 | 5/2014 |
| WO | 2014079329 A1 | 5/2014 |

OTHER PUBLICATIONS

"Link Level Evaluation of DMRS Ports for MU MIMO," 3GPP TSG RAN WG1#61, Montreal, Canada, R1-103344, pp. 1-4, 3rd Generation Partnership Project, Valbonne, France (May 10-14, 2010).

"DCI Design for TM10", 3GPP TSG RAN WG1 Meeting #70b, San Diego, USA, R1-124235, pp. 1-7, 3rd Generation Partnership Project, Valbonne, France (Oct. 8-12, 2012).

CN/201910498365, Office Action, dated Jan. 28, 2021.

U.S. Appl. No. 15/630,303, filed Jun. 22, 2017.

* cited by examiner

CHANNEL MEASUREMENT AND FEEDBACK METHOD, NETWORK DEVICE, AND SYSTEM

CROSS-REFERENCE TO RELATED APPLICATION

This application is a continuation of U.S. patent application Ser. No. 15/630,303, filed on Jun. 22, 2017, which is a continuation of International Application No. PCT/CN2014/094586, filed on Dec. 23, 2014. All of the afore-mentioned patent applications are hereby incorporated by reference in their entireties.

TECHNICAL FIELD

The present invention relates to the field of communications technologies, and in particular, to a channel measurement and feedback method, a network device, and a system.

BACKGROUND

Beamforming is a signal processing technology, and is based on an adaptive antenna principle. An objective is to form optimal combination or allocation for baseband signals according to a system performance indicator. When a base station communicates with user equipment (User Equipment, UE for short), the base station usually first sends a pilot signal to the UE, the UE performs channel measurement according to the pilot signal and feeds back a result to the base station, and the base station performs adaptive adjustment on an antenna according to the result of channel measurement, so that a main lobe of a beam emitted by the antenna aims at the UE (this process is referred to as beamforming), and the UE is configured correspondingly. Therefore, the UE can communicate with the base station by using the main lobe that aims at the UE and that is of the beam.

During multi-user multiple input multiple output (Multi-User Multiple Input Multiple Output, MU MIMO for short) communication, a base station may communicate with at least two UEs on a same time frequency resource. Interference may exist between the UEs. However, when UE performs channel measurement according to a pilot signal, the UE measures only a channel used for transmitting data between the base station and the UE and feeds back a result to the base station, and the interference between the UEs is not considered. Consequently, the measurement result received by the base station is inaccurate, and the base station configures the UEs inappropriately.

SUMMARY

To resolve a problem that because a feedback channel estimation result is inaccurate, system adaptation is inaccurate, embodiments of the present invention provide a channel measurement and feedback method, a network device, and a system. The technical solutions are as follows.

According to a first aspect, an embodiment of the present invention provides a channel measurement and feedback method, where the method includes:

receiving, by a first network device, pilot port configuration information sent by a second network device, where the pilot port configuration information is used to describe at least two pilot ports;

measuring, by using the at least two pilot ports, a pilot signal sent by the second network device, and determining first information, where the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI; and feeding back the first information to the second network device.

With reference to the first aspect, in a possible implementation manner of the present invention, the pilot port configuration information includes at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

With reference to the first aspect, in another possible implementation manner of the present invention, the at least two pilot ports are one group of pilot ports or at least two groups of pilot ports, each group of pilot ports is described by using the independently configured pilot port configuration information, and one group of pilot ports includes at least one pilot port.

With reference to the first aspect, in still another possible implementation manner of the present invention, when the at least two pilot ports are the one group of pilot ports, the information about the pilot port used by the first network device in the second information includes a port number of at least one pilot port selected by the first network device for the first network device in the one group of pilot ports, and the information about the pilot port used by the third network device in the third information includes a port number of at least one pilot port selected by the first network device for the third network device in the one group of pilot ports; or when the at least two pilot ports are the at least two groups of pilot ports, the information about the pilot port used by the first network device in the first information includes a group number of at least one group of pilot ports selected by the first network device for the first network device in the at least two groups of pilot ports, and the information about the pilot port used by the third network device in the third information includes a group number of at least one group of pilot ports selected by the first network device for the third network device in the at least two groups of pilot ports.

With reference to the first aspect, in still another possible implementation manner of the present invention, the independently configured pilot port configuration information is in one-to-one correspondence to configuration information of a channel state information process CSI process, and configuration information of each CSI process includes configuration information of a non-zero power channel state information-reference signal CSI-RS and configuration information of a channel state information interference measurement reference signal CSI-IM.

With reference to the first aspect, in still another possible implementation manner of the present invention, when the at least two pilot ports are the at least two groups of pilot ports, the information about the pilot port used by the first network device in the first information includes a process number of a CSI process corresponding to at least one group of pilot ports selected by the first network device for the first network device in the at least two groups of pilot ports, and the information about the pilot port used by the third network device in the third information includes a process number of a CSI process corresponding to at least one group of pilot ports selected by the first network device for the third network device in the at least two groups of pilot ports.

With reference to the first aspect, in still another possible implementation manner of the present invention, the information about the pilot port used by the first network device further includes at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device further includes at least one of a subband for transmitting a pilot signal of the pilot port used by the third network device, a pilot sequence of the pilot signal of the pilot port used by the third network device, or a transmit power of the pilot signal of the pilot port used by the third network device.

With reference to the first aspect, in still another possible implementation manner of the present invention, the at least two pilot ports include a first-category pilot port and a second-category pilot port, the first-category pilot port includes at least one group of pilot ports, and the second-category pilot port includes at least two pilot ports.

With reference to the first aspect, in still another possible implementation manner of the present invention, the first-category pilot port is a pilot port of a periodically sent pilot signal, and the second-category pilot port is a pilot port of an aperiodically sent pilot signal; or the first-category pilot port is a pilot port configured by using radio resource control RRC signaling, the second-category pilot port is a pilot port configured by using downlink control signaling, and the downlink control signaling is downlink scheduling DL grant signaling or uplink scheduling UL grant signaling; or the first-category pilot port is a pilot port of a pilot signal that is not precoded, and the second-category pilot port is a pilot port of a precoded pilot signal; or the first-category pilot port is a CRS pilot port or a CSI-RS pilot port, and the second-category pilot port is a demodulation reference signal DMRS pilot port; or the first-category pilot port is a pilot port of pilot signals sent in all subbands, and the second-category pilot port is a pilot port of a pilot signal sent in a specified subband; or a subband for transmitting a pilot signal by using the first-category pilot port is fixed, and a subband for transmitting a pilot signal by using the second-category pilot port is variable.

With reference to the first aspect, in still another possible implementation manner of the present invention, the second-category pilot port includes a first pilot port for transmitting a first pilot signal and a second pilot port for transmitting a second pilot signal, the first pilot signal and the second pilot signal are sent by the second network device by performing spatial multiplexing on the same time frequency resource, the first network device measures, by using the first pilot signal, a signal received by the first network device, the first network device measures, by using the second pilot signal, momentary interference to the signal received by the first network device, and the momentary interference is interference that is caused, because the third network device and the first network device perform spatial multiplexing on the same time frequency resource, to the signal received by the first network device.

With reference to the first aspect, in still another possible implementation manner of the present invention, both the first pilot signal and the second pilot signal are non-zero power pilot signals.

With reference to the first aspect, in still another possible implementation manner of the present invention, the first pilot signal and a data signal that is sent by the second network device to the first network device use a same precoding matrix, and the second pilot signal and a data signal that is sent by the second network device to the third network device use a same precoding matrix.

With reference to the first aspect, in still another possible implementation manner of the present invention, the first pilot signal is a demodulation pilot signal of the data signal sent by the second network device to the first network device; or the second pilot signal is a demodulation pilot signal of the data signal sent by the second network device to the third network device; or the first pilot signal is a demodulation pilot signal of the data signal sent by the second network device to the first network device, and the second pilot signal is a demodulation pilot signal of the data signal sent by the second network device to the third network device.

With reference to the first aspect, in still another possible implementation manner of the present invention, the measuring, by using the at least two pilot ports, a pilot signal sent by the second network device includes:

receiving a signal that is sent by the second network device in a first time unit, where the signal sent by the second network device in the first time unit includes the first pilot signal and the second pilot signal, and the signal sent by the second network device in the first time unit does not include the data signal that is sent to the first network device and whose demodulation pilot signal is the first pilot signal or the data signal that is sent to the third network device and whose demodulation pilot signal is the second pilot signal; or the signal sent by the second network device in the first time unit includes the first pilot signal, the second pilot signal, the data signal that is sent to the first network device and whose demodulation pilot signal is the first pilot signal, and the data signal that is sent to the third network device and whose demodulation pilot signal is the second pilot signal; or the signal sent by the second network device in the first time unit includes the first pilot signal, the second pilot signal, and the data signal that is sent to the first network device and whose demodulation pilot signal is the first pilot signal, and the signal sent by the second network device in the first time unit does not include the data signal that is sent to the third network device and whose demodulation pilot signal is the second pilot signal; or the signal sent by the second network device in the first time unit includes the first pilot signal, the second pilot signal, and the data signal that is sent to the third network device and whose demodulation pilot signal is the second pilot signal, and the signal sent by the second network device in the first time unit does not include the data signal that is sent to the first network device and whose demodulation pilot signal is the first pilot signal.

With reference to the first aspect, in still another possible implementation manner of the present invention, the first time unit is one timeslot, one subframe, or one radio frame.

With reference to the first aspect, in still another possible implementation manner of the present invention, first information determined by means of measurement by using the first-category pilot port does not include a CQI when it is assumed that the first network device and the third network device communicate with the second network device by performing spatial multiplexing on the same time frequency resource, and first information determined by means of measurement by using the second-category pilot port includes a CQI when it is assumed that the first network device and the third network device communicate with the second network device by performing spatial multiplexing on the same time frequency resource.

With reference to the first aspect, in still another possible implementation manner of the present invention, each of first information determined by means of measurement by using the first-category pilot port and first information determined by means of measurement by using the second-category pilot port includes a CQI when it is assumed that the first network device and the third network device communicate with the second network device by performing spatial multiplexing on the same time frequency resource, and the CQI in the first information determined by means of measurement by using the second-category pilot port is associated with the CQI in the first information determined by means of measurement by using the first-category pilot port.

With reference to the first aspect, in still another possible implementation manner of the present invention, that the CQI in the first information determined by means of measurement by using the second-category pilot port is associated with the CQI in the first information determined by means of measurement by using the first-category pilot port includes that the CQI in the first information determined by means of measurement by using the second-category pilot port is obtained after difference is performed on the CQI in the first information determined by means of measurement by using the first-category pilot port.

With reference to the first aspect, in still another possible implementation manner of the present invention, feedback modes of the second information and the third information are independently configured in one or more of the following manners, where the feedback modes include subband feedback and broadband feedback, the subband feedback is separately feeding back one piece of the second information or the third information for each subband, and the broadband feedback is feeding back one piece of the second information or the third information for all subbands;

the feedback mode of the second information is the subband feedback, and the feedback mode of the third information is the broadband feedback;

in the second information, feedback modes of the information about the pilot port used by the first network device, the RI used by the first network device, and the PMI used by the first network device are the broadband feedback, and a feedback mode of the CQI is the subband feedback, or in the second information, feedback modes of the information about the pilot port used by the first network device and the RI used by the first network device are the broadband feedback, and feedback modes of the PMI used by the first network device and the CQI are the subband feedback, or in the second information, a feedback mode of the information about the pilot port used by the first network device is the broadband feedback, and feedback modes of the RI used by the first network device, the PMI used by the first network device, and the CQI are the subband feedback; and in the third information, feedback modes of the information about the pilot port used by the third network device, the RI used by the third network device, and the PMI used by the third network device are the broadband feedback, and a feedback mode of the CQI is the subband feedback, or in the third information, feedback modes of the information about the pilot port used by the third network device and the RI used by the third network device are the broadband feedback, and feedback modes of the PMI used by the third network device and the CQI are the subband feedback, or in the third information, a feedback mode of the information about the pilot port used by the third network device is the broadband feedback, and feedback modes of the RI used by the third network device, the PMI used by the third network device, and the CQI are the subband feedback.

With reference to the first aspect, in still another possible implementation manner of the present invention, a subband for feeding back the information about the pilot port used by the first network device in the second information is configured independently from a subband for feeding back the RI used by the first network device, the PMI used by the first network device, or the CQI in the second information; or a subband for feeding back the information about the pilot port used by the third network device in the third information is configured independently from a subband for feeding back the RI used by the third network device, the PMI used by the third network device, or the CQI in the third information; or a subband for feeding back the information about the pilot port used by the first network device in the second information is configured independently from a subband for feeding back the RI used by the first network device, the PMI used by the first network device, or the CQI in the second information, and a subband for feeding back the information about the pilot port used by the third network device in the third information is configured independently from a subband for feeding back the RI used by the third network device, the PMI used by the third network device, or the CQI in the third information.

With reference to the first aspect, in still another possible implementation manner of the present invention, feedback periods of the second information and the third information are configured independently in one or more of the following manners:

the feedback period of the second information is shorter than the feedback period of the third information;

in the second information, a feedback period of the information about the pilot port used by the first network device is longer than a feedback period of the RI used by the first network device, the PMI used by the first network device, or the CQI, or in the second information, a feedback period of the information about the pilot port used by the first network device or the RI used by the first network device is longer than a feedback period of the PMI used by the first network device or the CQI, or in the second information, a feedback period of the information about the pilot port used by the first network device, the RI used by the first network device, or the PMI used by the first network device is longer than a feedback period of the CQI; and in the third information, a feedback period of the information about the pilot port used by the third network device is longer than a feedback period of the RI used by the third network device, the PMI used by the third network device, or the CQI, or in the third information, a feedback period of the information about the pilot port used by the third network device or the RI used by the third network device is longer than a feedback period of the PMI used by the third network device or the CQI, or in the third information, a feedback period of the information about the pilot port used by the third network device, the RI used by the third network device, or the PMI used by the third network device is longer than a feedback period of the CQI.

With reference to the first aspect, in still another possible implementation manner of the present invention, a period for feeding back the information about the pilot port used by the first network device in the second information is configured independently from a period for feeding back the RI used by the first network device, the PMI used by the first network device, or the CQI in the second information; or a period for feeding back the information about the pilot port used by the third network device in the third information is configured independently from a period for feeding back the RI used by the third network device, the PMI used by the third network device, or the CQI in the third information; or a period for feeding back the information about the pilot port used by the first network device in the second information is configured independently from a period for feeding back the RI used by the first network device, the PMI used by the first network device, or the CQI in the second information, and a period for feeding back the information about the pilot port used by the third network device in the third information is configured independently from a period for feeding back the RI used by the third network device, the PMI used by the third network device, or the CQI in the third information.

With reference to the first aspect, in still another possible implementation manner of the present invention, the first information further includes fourth information of the first network device when it is assumed that the first network device and the second network device perform single user multiple input multiple output SU-MIMO communication, and the fourth information includes at least one of configuration information of a pilot port used by the first network device, an RI used by the first network device, a PMI used by the first network device, or a CQI.

With reference to the first aspect, in still another possible implementation manner of the present invention, when the first information includes the second information, the third information, and the fourth information, if a sum of information amounts of the second information, the third information, and the fourth information is greater than a largest amount of information transmitted by the first network device, the fourth information is discarded preferentially to the third information, and the third information is discarded preferentially to the second information; or the fourth information is discarded preferentially to the second information, and the second information is discarded preferentially to the third information; or the second information is discarded preferentially to the third information, and the third information is discarded preferentially to the fourth information; or the second information is discarded preferentially to the fourth information, and the fourth information is discarded preferentially to the third information; or the third information is discarded preferentially to the second information, and the second information is discarded preferentially to the fourth information; or the third information is discarded preferentially to the fourth information, and the fourth information is discarded preferentially to the second information.

According to a second aspect, an embodiment of the present invention provides a channel measurement and feedback method, where the method includes:

sending, by a second network device, pilot port configuration information, where the pilot port configuration information is used to describe at least two pilot ports; and receiving first information fed back by a first network device, where the first information is determined by the first network device by measuring, by using the at least two pilot ports, a pilot signal sent by the second network device, the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI.

With reference to the second aspect, in a possible implementation manner of the present invention, the pilot port configuration information includes at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

With reference to the second aspect, in another possible implementation manner of the present invention, the at least two pilot ports are one group of pilot ports or at least two groups of pilot ports, each group of pilot ports is described by using the independently configured pilot port configuration information, and one group of pilot ports includes at least one pilot port.

With reference to the second aspect, in still another possible implementation manner of the present invention, when the at least two pilot ports are the one group of pilot ports, the information about the pilot port used by the first network device in the second information includes a port number of at least one pilot port selected by the first network device for the first network device in the one group of pilot ports, and the information about the pilot port used by the third network device in the third information includes a port number of at least one pilot port selected by the first network device for the third network device in the one group of pilot ports; or when the at least two pilot ports are the at least two groups of pilot ports, the information about the pilot port used by the first network device in the first information includes a group number of at least one group of pilot ports selected by the first network device for the first network device in the at least two groups of pilot ports, and the information about the pilot port used by the third network device in the third information includes a group number of at least one group of pilot ports selected by the first network device for the third network device in the at least two groups of pilot ports.

With reference to the second aspect, in still another possible implementation manner of the present invention, the independently configured pilot port configuration information is in one-to-one correspondence to configuration information of a channel state information process CSI process, and configuration information of each CSI process includes configuration information of a non-zero power channel state information-reference signal CSI-RS and configuration information of a channel state information interference measurement reference signal CSI-IM.

With reference to the second aspect, in still another possible implementation manner of the present invention, when the at least two pilot ports are the at least two groups of pilot ports, the information about the pilot port used by the first network device in the first information includes a process number of a CSI process corresponding to at least one group of pilot ports selected by the first network device for the first network device in the at least two groups of pilot ports, and the information about the pilot port used by the third network device in the third information includes a process number of a CSI process corresponding to at least one group of pilot ports selected by the first network device for the third network device in the at least two groups of pilot ports.

With reference to the second aspect, in still another possible implementation manner of the present invention, the information about the pilot port used by the first network device further includes at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device further includes at least one of a subband for transmitting a pilot signal of the pilot port used by the third network device, a pilot sequence of the pilot signal of the pilot port used by the third network device, or a transmit power of the pilot signal of the pilot port used by the third network device.

With reference to the second aspect, in still another possible implementation manner of the present invention, the at least two pilot ports include a first-category pilot port and a second-category pilot port, the first-category pilot port includes at least one group of pilot ports, and the second-category pilot port includes at least two pilot ports.

With reference to the second aspect, in still another possible implementation manner of the present invention, the first-category pilot port is a pilot port of a periodically sent pilot signal, and the second-category pilot port is a pilot port of an aperiodically sent pilot signal; or the first-category pilot port is a pilot port configured by using radio resource control RRC signaling, the second-category pilot port is a pilot port configured by using downlink control signaling, and the downlink control signaling is downlink scheduling DL grant signaling or uplink scheduling UL grant signaling; or the first-category pilot port is a pilot port of a pilot signal that is not precoded, and the second-category pilot port is a pilot port of a precoded pilot signal; or the first-category pilot port is a CRS pilot port or a CSI-RS pilot port, and the second-category pilot port is a demodulation reference signal DMRS pilot port; or the first-category pilot port is a pilot port of pilot signals sent in all subbands, and the second-category pilot port is a pilot port of a pilot signal sent in a specified subband; or a subband for transmitting a pilot signal by using the first-category pilot port is fixed, and a subband for transmitting a pilot signal by using the second-category pilot port is variable.

With reference to the second aspect, in still another possible implementation manner of the present invention, the second-category pilot port includes a first pilot port for transmitting a first pilot signal and a second pilot port for transmitting a second pilot signal, the first pilot signal and the second pilot signal are sent by the second network device by performing spatial multiplexing on the same time frequency resource, the first network device measures, by using the first pilot signal, a signal received by the first network device, the first network device measures, by using the second pilot signal, momentary interference to the signal received by the first network device, and the momentary interference is interference that is caused, because the third network device and the first network device perform spatial multiplexing on the same time frequency resource, to the signal received by the first network device.

With reference to the second aspect, in still another possible implementation manner of the present invention, both the first pilot signal and the second pilot signal are non-zero power pilot signals.

With reference to the second aspect, in still another possible implementation manner of the present invention, the first pilot signal and a data signal that is sent by the second network device to the first network device use a same precoding matrix, and the second pilot signal and a data signal that is sent by the second network device to the third network device use a same precoding matrix.

With reference to the second aspect, in still another possible implementation manner of the present invention, the first pilot signal is a demodulation pilot signal of the data signal sent by the second network device to the first network device; or the second pilot signal is a demodulation pilot signal of the data signal sent by the second network device to the third network device; or the first pilot signal is a demodulation pilot signal of the data signal sent by the second network device to the first network device, and the second pilot signal is a demodulation pilot signal of the data signal sent by the second network device to the third network device.

With reference to the second aspect, in still another possible implementation manner of the present invention, the method further includes:

sending a signal in a first time unit, where the signal sent in the first time unit includes the first pilot signal and the second pilot signal, and the signal sent in the first time unit does not include the data signal that is sent to the first network device and whose demodulation pilot signal is the first pilot signal or the data signal that is sent to the third network device and whose demodulation pilot signal is the second pilot signal; or the signal sent in the first time unit includes the first pilot signal, the second pilot signal, the data signal that is sent to the first network device and whose demodulation pilot signal is the first pilot signal, and the data signal that is sent to the third network device and whose demodulation pilot signal is the second pilot signal; or the signal sent in the first time unit includes the first pilot signal, the second pilot signal, and the data signal that is sent to the first network device and whose demodulation pilot signal is the first pilot signal, and the signal sent in the first time unit does not include the data signal that is sent to the third network device and whose demodulation pilot signal is the second pilot signal; or the signal sent in the first time unit includes the first pilot signal, the second pilot signal, and the data signal that is sent to the third network device and whose demodulation pilot signal is the second pilot signal, and the signal sent in the first time unit does not include the data signal that is sent to the first network device and whose demodulation pilot signal is the first pilot signal.

With reference to the second aspect, in still another possible implementation manner of the present invention, the first time unit is one timeslot, one subframe, or one radio frame.

With reference to the second aspect, in still another possible implementation manner of the present invention, received first information determined by the second network device by means of measurement by using the first-category pilot port does not include a CQI when it is assumed that the first network device and the third network device communicate with the second network device by performing spatial multiplexing on the same time frequency resource, and received first information determined by the second network device by means of measurement by using the second-category pilot port includes a CQI when it is assumed that the first network device and the third network device communicate with the second network device by performing spatial multiplexing on the same time frequency resource.

With reference to the second aspect, in still another possible implementation manner of the present invention, both received first information determined by the second network device by means of measurement by using the first-category pilot port and received first information determined by the second network device by means of measurement by using the second-category pilot port include a CQI when it is assumed that the first network device and the third network device communicate with the second network device by performing spatial multiplexing on the same time frequency resource, and the CQI in the received first information determined by the second network device by means of measurement by using the second-category pilot port is associated with the CQI in the received first information determined by the second network device by means of measurement by using the first-category pilot port.

With reference to the second aspect, in still another possible implementation manner of the present invention, that the CQI in the received first information determined by the second network device by means of measurement by using the second-category pilot port is associated with the CQI in the received first information determined by the second network device by means of measurement by using the first-category pilot port includes that the CQI in the received first information determined by the second network device by means of measurement by using the second-category pilot port is obtained after difference is performed on the CQI in the received first information determined by the second network device by means of measurement by using the first-category pilot port.

With reference to the second aspect, in still another possible implementation manner of the present invention, feedback modes of the second information and the third information are independently configured in one or more of the following manners, where the feedback modes include subband feedback and broadband feedback, the subband feedback is separately feeding back one piece of the second information or the third information for each subband, and the broadband feedback is feeding back one piece of the second information or the third information for all subbands;

the feedback mode of the second information is the subband feedback, and the feedback mode of the third information is the broadband feedback;

in the second information, feedback modes of the information about the pilot port used by the first network device, the RI used by the first network device, and the PMI used by the first network device are the broadband feedback, and a feedback mode of the CQI is the subband feedback, or in the second information, feedback modes of the information about the pilot port used by the first network device and the RI used by the first network device are the broadband feedback, and feedback modes of the PMI used by the first network device and the CQI are the subband feedback, or in the second information, a feedback mode of the information about the pilot port used by the first network device is the broadband feedback, and feedback modes of the RI used by the first network device, the PMI used by the first network device, and the CQI are the subband feedback; and in the third information, feedback modes of the information about the pilot port used by the third network device, the RI used by the third network device, and the PMI used by the third network device are the broadband feedback, and a feedback mode of the CQI is the subband feedback, or in the third information, feedback modes of the information about the pilot port used by the third network device and the RI used by the third network device are the broadband feedback, and feedback modes of the PMI used by the third network device and the CQI are the subband feedback, or in the third information, a feedback mode of the information about the pilot port used by the third network device is the broadband feedback, and feedback modes of the RI used by the third network device, the PMI used by the third network device, and the CQI are the subband feedback.

With reference to the second aspect, in still another possible implementation manner of the present invention, a subband for feeding back the information about the pilot port used by the first network device in the second information is configured independently from a subband for feeding back the RI used by the first network device, the PMI used by the first network device, or the CQI in the second information; or a subband for feeding back the information about the pilot port used by the third network device in the third information is configured independently from a subband for feeding back the RI used by the third network device, the PMI used by the third network device, or the CQI in the third information; or a subband for feeding back the information about the pilot port used by the first network device in the second information is configured independently from a subband for feeding back the RI used by the first network device, the PMI used by the first network device, or the CQI in the second information, and a subband for feeding back the information about the pilot port used by the third network device in the third information is configured independently from a subband for feeding back the RI used by the third network device, the PMI used by the third network device, or the CQI in the third information.

With reference to the second aspect, in still another possible implementation manner of the present invention, feedback periods of the second information and the third information are configured independently in one or more of the following manners:

the feedback period of the second information is shorter than the feedback period of the third information;

in the second information, a feedback period of the information about the pilot port used by the first network device is longer than a feedback period of the RI used by the first network device, the PMI used by the first network device, or the CQI, or in the second information, a feedback period of the information about the pilot port used by the first network device or the RI used by the first network device is longer than a feedback period of the PMI used by the first network device or the CQI, or in the second information, a feedback period of the information about the pilot port used by the first network device, the RI used by the first network device, or the PMI used by the first network device is longer than a feedback period of the CQI; and in the third information, a feedback period of the information about the pilot port used by the third network device is longer than a feedback period of the RI used by the third network device, the PMI used by the third network device, or the CQI, or in the third information, a feedback period of the information about the pilot port used by the third network device or the RI used by the third network device is longer than a feedback period of the PMI used by the third network device or the CQI, or in the third information, a feedback period of the information about the pilot port used by the third network device, the RI used by the third network device, or the PMI used by the third network device is longer than a feedback period of the CQI.

With reference to the second aspect, in still another possible implementation manner of the present invention, a period for feeding back the information about the pilot port used by the first network device in the second information is configured independently from a period for feeding back the RI used by the first network device, the PMI used by the first network device, or the CQI in the second information; or a period for feeding back the information about the pilot port used by the third network device in the third information is configured independently from a period for feeding back the RI used by the third network device, the PMI used by the third network device, or the CQI in the third information; or a period for feeding back the information about the pilot port used by the first network device in the second information is configured independently from a period for feeding back the RI used by the first network device, the PMI used by the first network device, or the CQI in the second information, and a period for feeding back the information about the pilot port used by the third network device in the third information is configured independently from a period for feeding back the RI used by the third network device, the PMI used by the third network device, or the CQI in the third information.

With reference to the second aspect, in still another possible implementation manner of the present invention, the first information further includes fourth information of the first network device when it is assumed that the first network device and the second network device perform single user multiple input multiple output SU-MIMO communication, and the fourth information includes at least one of configuration information of a pilot port used by the first network device, an RI used by the first network device, a PMI used by the first network device, or a CQI.

According to a third aspect, an embodiment of the present invention provides a first network device, where the first network device includes:

a receiving module, configured to receive pilot port configuration information sent by a second network device, where the pilot port configuration information is used to describe at least two pilot ports;

a determining module, configured to: measure, by using the at least two pilot ports, a pilot signal sent by the second network device, and determine first information, where the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI; and a sending module, configured to feed back the first information to the second network device.

With reference to the third aspect, in a possible implementation manner of the present invention, the pilot port configuration information includes at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

With reference to the third aspect, in another possible implementation manner of the present invention, the at least two pilot ports are one group of pilot ports or at least two groups of pilot ports, each group of pilot ports is described by using the independently configured pilot port configuration information, and one group of pilot ports includes at least one pilot port.

With reference to the third aspect, in still another possible implementation manner of the present invention, when the at least two pilot ports are the one group of pilot ports, the information about the pilot port used by the first network device in the second information includes a port number of at least one pilot port selected by the first network device for the first network device in the one group of pilot ports, and the information about the pilot port used by the third network device in the third information includes a port number of at least one pilot port selected by the first network device for the third network device in the one group of pilot ports; or when the at least two pilot ports are the at least two groups of pilot ports, the information about the pilot port used by the first network device in the first information includes a group number of at least one group of pilot ports selected by the first network device for the first network device in the at least two groups of pilot ports, and the information about the pilot port used by the third network device in the third information includes a group number of at least one group of pilot ports selected by the first network device for the third network device in the at least two groups of pilot ports.

With reference to the third aspect, in still another possible implementation manner of the present invention, the independently configured pilot port configuration information is in one-to-one correspondence to configuration information of a channel state information process CSI process, and configuration information of each CSI process includes configuration information of a non-zero power channel state information-reference signal CSI-RS and configuration information of a channel state information interference measurement reference signal CSI-IM.

With reference to the third aspect, in still another possible implementation manner of the present invention, when the at least two pilot ports are the at least two groups of pilot ports, the information about the pilot port used by the first network device in the first information includes a process number of a CSI process corresponding to at least one group of pilot ports selected by the first network device for the first network device in the at least two groups of pilot ports, and the information about the pilot port used by the third network device in the third information includes a process number of a CSI process corresponding to at least one group of pilot ports selected by the first network device for the third network device in the at least two groups of pilot ports.

With reference to the third aspect, in still another possible implementation manner of the present invention, the information about the pilot port used by the first network device further includes at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device further includes at least one of a subband for transmitting a pilot signal of the pilot port used by the third network device, a pilot sequence of the pilot signal of the pilot port used by the third network device, or a transmit power of the pilot signal of the pilot port used by the third network device.

With reference to the third aspect, in still another possible implementation manner of the present invention, the at least two pilot ports include a first-category pilot port and a second-category pilot port, the first-category pilot port includes at least one group of pilot ports, and the second-category pilot port includes at least two pilot ports.

With reference to the third aspect, in still another possible implementation manner of the present invention, the first-category pilot port is a pilot port of a periodically sent pilot signal, and the second-category pilot port is a pilot port of an aperiodically sent pilot signal; or the first-category pilot port is a pilot port configured by using radio resource control RRC signaling, the second-category pilot port is a pilot port configured by using downlink control signaling, and the downlink control signaling is downlink scheduling DL grant signaling or uplink scheduling UL grant signaling; or the first-category pilot port is a pilot port of a pilot signal that is not precoded, and the second-category pilot port is a pilot port of a precoded pilot signal; or the first-category pilot port is a CRS pilot port or a CSI-RS pilot port, and the second-category pilot port is a demodulation reference signal DMRS pilot port; or the first-category pilot port is a pilot port of pilot signals sent in all subbands, and the second-category pilot port is a pilot port of a pilot signal sent in a specified subband; or a subband for transmitting a pilot signal by using the first-category pilot port is fixed, and a subband for transmitting a pilot signal by using the second-category pilot port is variable.

With reference to the third aspect, in still another possible implementation manner of the present invention, the second-category pilot port includes a first pilot port for transmitting a first pilot signal and a second pilot port for transmitting a second pilot signal, the first pilot signal and the second pilot signal are sent by the second network device by performing spatial multiplexing on the same time frequency resource, the first network device measures, by using the first pilot signal, a signal received by the first network device, the first network device measures, by using the second pilot signal, momentary interference to the signal received by the first network device, and the momentary interference is interference that is caused, because the third network device and the first network device perform spatial multiplexing on the same time frequency resource, to the signal received by the first network device.

With reference to the third aspect, in still another possible implementation manner of the present invention, both the first pilot signal and the second pilot signal are non-zero power pilot signals.

With reference to the third aspect, in still another possible implementation manner of the present invention, the first pilot signal and a data signal that is sent by the second network device to the first network device use a same precoding matrix, and the second pilot signal and a data signal that is sent by the second network device to the third network device use a same precoding matrix.

With reference to the third aspect, in still another possible implementation manner of the present invention, the first pilot signal is a demodulation pilot signal of the data signal sent by the second network device to the first network device; or the second pilot signal is a demodulation pilot signal of the data signal sent by the second network device to the third network device; or the first pilot signal is a demodulation pilot signal of the data signal sent by the second network device to the first network device, and the second pilot signal is a demodulation pilot signal of the data signal sent by the second network device to the third network device.

With reference to the third aspect, in still another possible implementation manner of the present invention, the determining module includes:

a receiving unit, configured to receive a signal that is sent by the second network device in a first time unit, where the signal sent by the second network device in the first time unit includes the first pilot signal and the second pilot signal, and the signal sent by the second network device in the first time unit does not include the data signal that is sent to the first network device and whose demodulation pilot signal is the first pilot signal or the data signal that is sent to the third network device and whose demodulation pilot signal is the second pilot signal; or the signal sent by the second network device in the first time unit includes the first pilot signal, the second pilot signal, the data signal that is sent to the first network device and whose demodulation pilot signal is the first pilot signal, and the data signal that is sent to the third network device and whose demodulation pilot signal is the second pilot signal; or the signal sent by the second network device in the first time unit includes the first pilot signal, the second pilot signal, and the data signal that is sent to the first network device and whose demodulation pilot signal is the first pilot signal, and the signal sent by the second network device in the first time unit does not include the data signal that is sent to the third network device and whose demodulation pilot signal is the second pilot signal; or the signal sent by the second network device in the first time unit includes the first pilot signal, the second pilot signal, and the data signal that is sent to the third network device and whose demodulation pilot signal is the second pilot signal, and the signal sent by the second network device in the first time unit does not include the data signal that is sent to the first network device and whose demodulation pilot signal is the first pilot signal.

With reference to the third aspect, in still another possible implementation manner of the present invention, the first time unit is one timeslot, one subframe, or one radio frame.

With reference to the third aspect, in still another possible implementation manner of the present invention, first information determined by means of measurement by using the first-category pilot port does not include a CQI when it is assumed that the first network device and the third network device communicate with the second network device by performing spatial multiplexing on the same time frequency resource, and first information determined by means of measurement by using the second-category pilot port includes a CQI when it is assumed that the first network device and the third network device communicate with the second network device by performing spatial multiplexing on the same time frequency resource.

With reference to the third aspect, in still another possible implementation manner of the present invention, both first information determined by means of measurement by using the first-category pilot port and first information determined by means of measurement by using the second-category pilot port include a CQI when it is assumed that the first network device and the third network device communicate with the second network device by performing spatial multiplexing on the same time frequency resource, and the CQI in the first information determined by means of measurement by using the second-category pilot port is associated with the CQI in the first information determined by means of measurement by using the first-category pilot port.

With reference to the third aspect, in still another possible implementation manner of the present invention, that the CQI in the first information determined by means of measurement by using the second-category pilot port is associated with the CQI in the first information determined by means of measurement by using the first-category pilot port includes that the CQI in the first information determined by means of measurement by using the second-category pilot port is obtained after difference is performed on the CQI in the first information determined by means of measurement by using the first-category pilot port.

With reference to the third aspect, in still another possible implementation manner of the present invention, feedback modes of the second information and the third information are independently configured in one or more of the following manners, where the feedback modes include subband feedback and broadband feedback, the subband feedback is separately feeding back one piece of the second information or the third information for each subband, and the broadband feedback is feeding back one piece of the second information or the third information for all subbands;

the feedback mode of the second information is the subband feedback, and the feedback mode of the third information is the broadband feedback;

in the second information, feedback modes of the information about the pilot port used by the first network device, the RI used by the first network device, and the PMI used by the first network device are the broadband feedback, and a feedback mode of the CQI is the subband feedback, or in the second information, feedback modes of the information about the pilot port used by the first network device and the RI used by the first network device are the broadband feedback, and feedback modes of the PMI used by the first network device and the CQI are the subband feedback, or in the second information, a feedback mode of the information about the pilot port used by the first network device is the broadband feedback, and feedback modes of the RI used by the first network device, the PMI used by the first network device, and the CQI are the subband feedback; and in the third information, feedback modes of the information about the pilot port used by the third network device, the RI used by the third network device, and the PMI used by the third network device are the broadband feedback, and a feedback mode of the CQI is the subband feedback, or in the third information, feedback modes of the information about the pilot port used by the third network device and the RI used by the third network device are the broadband feedback, and feedback modes of the PMI used by the third network device and the CQI are the subband feedback, or in the third information, a feedback mode of the information about the pilot port used by the third network device is the broadband feedback, and feedback modes of the RI used by the third network device, the PMI used by the third network device, and the CQI are the subband feedback.

With reference to the third aspect, in still another possible implementation manner of the present invention, a subband for feeding back the information about the pilot port used by the first network device in the second information is configured independently from a subband for feeding back the RI used by the first network device, the PMI used by the first network device, or the CQI in the second information; or a subband for feeding back the information about the pilot port used by the third network device in the third information is configured independently from a subband for feeding back the RI used by the third network device, the PMI used by the third network device, or the CQI in the third information; or a subband for feeding back the information about the pilot port used by the first network device in the second information is configured independently from a subband for feeding back the RI used by the first network device, the PMI used by the first network device, or the CQI in the second information, and a subband for feeding back the information about the pilot port used by the third network device in the third information is configured independently from a subband for feeding back the RI used by the third network device, the PMI used by the third network device, or the CQI in the third information.

With reference to the third aspect, in still another possible implementation manner of the present invention, feedback periods of the second information and the third information are configured independently in one or more of the following manners:

the feedback period of the second information is shorter than the feedback period of the third information;

in the second information, a feedback period of the information about the pilot port used by the first network device is longer than a feedback period of the RI used by the first network device, the PMI used by the first network device, or the CQI, or in the second information, a feedback period of the information about the pilot port used by the first network device or the RI used by the first network device is longer than a feedback period of the PMI used by the first network device or the CQI, or in the second information, a feedback period of the information about the pilot port used by the first network device, the RI used by the first network device, or the PMI used by the first network device is longer than a feedback period of the CQI; and in the third information, a feedback period of the information about the pilot port used by the third network device is longer than a feedback period of the RI used by the third network device, the PMI used by the third network device, or the CQI, or in the third information, a feedback period of the information about the pilot port used by the third network device or the RI used by the third network device is longer than a feedback period of the PMI used by the third network device or the CQI, or in the third information, a feedback period of the information about the pilot port used by the third network device, the RI used by the third network device, or the PMI used by the third network device is longer than a feedback period of the CQI.

With reference to the third aspect, in still another possible implementation manner of the present invention, a period for feeding back the information about the pilot port used by the first network device in the second information is configured independently from a period for feeding back the RI used by the first network device, the PMI used by the first network device, or the CQI in the second information; or a period for feeding back the information about the pilot port used by the third network device in the third information is configured independently from a period for feeding back the RI used by the third network device, the PMI used by the third network device, or the CQI in the third information; or a period for feeding back the information about the pilot port used by the first network device in the second information is configured independently from a period for feeding back the RI used by the first network device, the PMI used by the first network device, or the CQI in the second information, and a period for feeding back the information about the pilot port used by the third network device in the third information is configured independently from a period for feeding back the RI used by the third network device, the PMI used by the third network device, or the CQI in the third information.

With reference to the third aspect, in still another possible implementation manner of the present invention, the first information further includes fourth information of the first network device when it is assumed that the first network device and the second network device perform single user multiple input multiple output SU-MIMO communication, and the fourth information includes at least one of configuration information of a pilot port used by the first network device, an RI used by the first network device, a PMI used by the first network device, or a CQI.

With reference to the third aspect, in still another possible implementation manner of the present invention, when the first information includes the second information, the third information, and the fourth information, if a sum of information amounts of the second information, the third information, and the fourth information is greater than a largest amount of information transmitted by the first network device, the fourth information is discarded preferentially to the third information, and the third information is discarded preferentially to the second information; or the fourth information is discarded preferentially to the second information, and the second information is discarded preferentially to the third information; or the second information is discarded preferentially to the third information, and the third information is discarded preferentially to the fourth information; or the second information is discarded preferentially to the fourth information, and the fourth information is discarded preferentially to the third information; or the third information is discarded preferentially to the second information, and the second information is discarded preferentially to the fourth information; or the third information is discarded preferentially to the fourth information, and the fourth information is discarded preferentially to the second information.

With reference to the third aspect, in still another possible implementation manner of the present invention, the first network device is first user equipment UE, the third network device is second UE, the second network device is a base station, and the base station controls communication of the first UE and communication of the second UE; or the first network device is a first secondary base station, the third network device is a second secondary base station, the second network device is a primary base station, and the primary base station controls communication of the first secondary base station and communication of the second secondary base station; or the first network device is first secondary UE, the third network device is second secondary UE, the second network device is primary UE, and the primary UE controls communication of the first secondary UE and communication of the second secondary UE.

According to a fourth aspect, an embodiment of the present invention provides a first network device, where the first network device includes:

a receiver, configured to receive pilot port configuration information sent by a second network device, where the pilot port configuration information is used to describe at least two pilot ports;

a processor, configured to: measure, by using the at least two pilot ports, a pilot signal sent by the second network device, and determine first information, where the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI; and a transmitter, configured to feed back the first information to the second network device.

According to a fifth aspect, an embodiment of the present invention provides a second network device, where the second network device includes:

a sending module, configured to send pilot port configuration information, where the pilot port configuration information is used to describe at least two pilot ports; and a receiving module, configured to receive first information fed back by a first network device, where the first information is determined by the first network device by measuring, by using the at least two pilot ports, a pilot signal sent by the second network device, the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI.

With reference to the fifth aspect, in a possible implementation manner of the present invention, the pilot port configuration information includes at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

With reference to the fifth aspect, in another possible implementation manner of the present invention, the at least two pilot ports are one group of pilot ports or at least two groups of pilot ports, each group of pilot ports is described by using the independently configured pilot port configuration information, and one group of pilot ports includes at least one pilot port.

With reference to the fifth aspect, in still another possible implementation manner of the present invention, when the at least two pilot ports are the one group of pilot ports, the information about the pilot port used by the first network device in the second information includes a port number of at least one pilot port selected by the first network device for the first network device in the one group of pilot ports, and the information about the pilot port used by the third network device in the third information includes a port number of at least one pilot port selected by the first network device for the third network device in the one group of pilot ports; or when the at least two pilot ports are the at least two groups of pilot ports, the information about the pilot port used by the first network device in the first information includes a group number of at least one group of pilot ports selected by the first network device for the first network device in the at least two groups of pilot ports, and the information about the pilot port used by the third network device in the third information includes a group number of at least one group of pilot ports selected by the first network device for the third network device in the at least two groups of pilot ports.

With reference to the fifth aspect, in still another possible implementation manner of the present invention, the independently configured pilot port configuration information is in one-to-one correspondence to configuration information of a channel state information process CSI process, and configuration information of each CSI process includes configuration information of a non-zero power channel state information-reference signal CSI-RS and configuration information of a channel state information interference measurement reference signal CSI-IM.

With reference to the fifth aspect, in still another possible implementation manner of the present invention, when the at least two pilot ports are the at least two groups of pilot ports, the information about the pilot port used by the first network device in the first information includes a process number of a CSI process corresponding to at least one group of pilot ports selected by the first network device for the first network device in the at least two groups of pilot ports, and the information about the pilot port used by the third network device in the third information includes a process number of a CSI process corresponding to at least one group of pilot ports selected by the first network device for the third network device in the at least two groups of pilot ports.

With reference to the fifth aspect, in still another possible implementation manner of the present invention, the information about the pilot port used by the first network device further includes at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device further includes at least one of a subband for transmitting a pilot signal of the pilot port used by the third network device, a pilot sequence of the pilot signal of the pilot port used by the third network device, or a transmit power of the pilot signal of the pilot port used by the third network device.

With reference to the fifth aspect, in still another possible implementation manner of the present invention, the at least two pilot ports include a first-category pilot port and a second-category pilot port, the first-category pilot port includes at least one group of pilot ports, and the second-category pilot port includes at least two pilot ports.

With reference to the fifth aspect, in still another possible implementation manner of the present invention, the first-category pilot port is a pilot port of a periodically sent pilot signal, and the second-category pilot port is a pilot port of an aperiodically sent pilot signal; or the first-category pilot port is a pilot port configured by using radio resource control RRC signaling, the second-category pilot port is a pilot port configured by using downlink control signaling, and the downlink control signaling is downlink scheduling DL grant signaling or uplink scheduling UL grant signaling; or the first-category pilot port is a pilot port of a pilot signal that is not precoded, and the second-category pilot port is a pilot port of a precoded pilot signal; or the first-category pilot port is a CRS pilot port or a CSI-RS pilot port, and the second-category pilot port is a demodulation reference signal DMRS pilot port; or the first-category pilot port is a pilot port of pilot signals sent in all subbands, and the second-category pilot port is a pilot port of a pilot signal sent in a specified subband; or a subband for transmitting a pilot signal by using the first-category pilot port is fixed, and a subband for transmitting a pilot signal by using the second-category pilot port is variable.

With reference to the fifth aspect, in still another possible implementation manner of the present invention, the second-category pilot port includes a first pilot port for transmitting a first pilot signal and a second pilot port for transmitting a second pilot signal, the first pilot signal and the second pilot signal are sent by the second network device by performing spatial multiplexing on the same time frequency resource, the first network device measures, by using the first pilot signal, a signal received by the first network device, the first network device measures, by using the second pilot signal, momentary interference to the signal received by the first network device, and the momentary interference is interference that is caused, because the third network device and the first network device perform spatial multiplexing on the same time frequency resource, to the signal received by the first network device.

With reference to the fifth aspect, in still another possible implementation manner of the present invention, both the first pilot signal and the second pilot signal are non-zero power pilot signals.

With reference to the fifth aspect, in still another possible implementation manner of the present invention, the first pilot signal and a data signal that is sent by the second network device to the first network device use a same precoding matrix, and the second pilot signal and a data signal that is sent by the second network device to the third network device use a same precoding matrix.

With reference to the fifth aspect, in still another possible implementation manner of the present invention, the first pilot signal is a demodulation pilot signal of the data signal sent by the second network device to the first network device; or the second pilot signal is a demodulation pilot signal of the data signal sent by the second network device to the third network device; or the first pilot signal is a demodulation pilot signal of the data signal sent by the second network device to the first network device, and the second pilot signal is a demodulation pilot signal of the data signal sent by the second network device to the third network device.

With reference to the fifth aspect, in still another possible implementation manner of the present invention, the method further includes:

sending a signal in a first time unit, where the signal sent in the first time unit includes the first pilot signal and the second pilot signal, and the signal sent in the first time unit does not include the data signal that is sent to the first network device and whose demodulation pilot signal is the first pilot signal or the data signal that is sent to the third network device and whose demodulation pilot signal is the second pilot signal; or the signal sent in the first time unit includes the first pilot signal, the second pilot signal, the data signal that is sent to the first network device and whose demodulation pilot signal is the first pilot signal, and the data signal that is sent to the third network device and whose demodulation pilot signal is the second pilot signal; or the signal sent in the first time unit includes the first pilot signal, the second pilot signal, and the data signal that is sent to the first network device and whose demodulation pilot signal is the first pilot signal, and the signal sent in the first time unit does not include the data signal that is sent to the third network device and whose demodulation pilot signal is the second pilot signal; or the signal sent in the first time unit includes the first pilot signal, the second pilot signal, and the data signal that is sent to the third network device and whose demodulation pilot signal is the second pilot signal, and the signal sent in the first time unit does not include the data signal that is sent to the first network device and whose demodulation pilot signal is the first pilot signal.

With reference to the fifth aspect, in still another possible implementation manner of the present invention, the first time unit is one timeslot, one subframe, or one radio frame.

With reference to the fifth aspect, in still another possible implementation manner of the present invention, received first information determined by the second network device by means of measurement by using the first-category pilot port does not include a CQI when it is assumed that the first network device and the third network device communicate with the second network device by performing spatial multiplexing on the same time frequency resource, and received first information determined by the second network device by means of measurement by using the second-category pilot port includes a CQI when it is assumed that the first network device and the third network device communicate with the second network device by performing spatial multiplexing on the same time frequency resource.

With reference to the fifth aspect, in still another possible implementation manner of the present invention, both received first information determined by the second network device by means of measurement by using the first-category pilot port and received first information determined by the second network device by means of measurement by using the second-category pilot port include a CQI when it is assumed that the first network device and the third network device communicate with the second network device by performing spatial multiplexing on the same time frequency resource, and the CQI in the received first information determined by the second network device by means of measurement by using the second-category pilot port is associated with the CQI in the received first information determined by the second network device by means of measurement by using the first-category pilot port.

With reference to the fifth aspect, in still another possible implementation manner of the present invention, that the CQI in the received first information determined by the second network device by means of measurement by using the second-category pilot port is associated with the CQI in the received first information determined by the second network device by means of measurement by using the first-category pilot port includes that the CQI in the received first information determined by the second network device by means of measurement by using the second-category pilot port is obtained after difference is performed on the CQI in the received first information determined by the second network device by means of measurement by using the first-category pilot port.

With reference to the fifth aspect, in still another possible implementation manner of the present invention, feedback modes of the second information and the third information are independently configured in one or more of the following manners, where the feedback modes include subband feedback and broadband feedback, the subband feedback is separately feeding back one piece of the second information or the third information for each subband, and the broadband feedback is feeding back one piece of the second information or the third information for all subbands;

the feedback mode of the second information is the subband feedback, and the feedback mode of the third information is the broadband feedback; or in the second information, feedback modes of the information about the pilot port used by the first network device, the RI used by the first network device, and the PMI used by the first network device are the broadband feedback, and a feedback mode of the CQI is the subband feedback, or in the second information, feedback modes of the information about the pilot port used by the first network device and the RI used by the first network device are the broadband feedback, and feedback modes of the PMI used by the first network device and the CQI are the subband feedback, or in the second information, a feedback mode of the information about the pilot port used by the first network device is the broadband feedback, and feedback modes of the RI used by the first network device, the PMI used by the first network device, and the CQI are the subband feedback; and in the third information, feedback modes of the information about the pilot port used by the third network device, the RI used by the third network device, and the PMI used by the third network device are the broadband feedback, and a feedback mode of the CQI is the subband feedback, or in the third information, feedback modes of the information about the pilot port used by the third network device and the RI used by the third network device are the broadband feedback, and feedback modes of the PMI used by the third network device and the CQI are the subband feedback, or in the third information, a feedback mode of the information about the pilot port used by the third network device is the broadband feedback, and feedback modes of the RI used by the third network device, the PMI used by the third network device, and the CQI are the subband feedback.

With reference to the fifth aspect, in still another possible implementation manner of the present invention, a subband for feeding back the information about the pilot port used by the first network device in the second information is configured independently from a subband for feeding back the RI used by the first network device, the PMI used by the first network device, or the CQI in the second information; or a subband for feeding back the information about the pilot port used by the third network device in the third information is configured independently from a subband for feeding back the RI used by the third network device, the PMI used by the third network device, or the CQI in the third information; or a subband for feeding back the information about the pilot port used by the first network device in the second information is configured independently from a subband for feeding back the RI used by the first network device, the PMI used by the first network device, or the CQI in the second information, and a subband for feeding back the information about the pilot port used by the third network device in the third information is configured independently from a subband for feeding back the RI used by the third network device, the PMI used by the third network device, or the CQI in the third information.

With reference to the fifth aspect, in still another possible implementation manner of the present invention, feedback periods of the second information and the third information are configured independently in one or more of the following manners:

the feedback period of the second information is shorter than the feedback period of the third information;

in the second information, a feedback period of the information about the pilot port used by the first network device is longer than a feedback period of the RI used by the first network device, the PMI used by the first network device, or the CQI, or in the second information, a feedback period of the information about the pilot port used by the first network device or the RI used by the first network device is longer than a feedback period of the PMI used by the first network device or the CQI, or in the second information, a feedback period of the information about the pilot port used by the first network device, the RI used by the first network device, or the PMI used by the first network device is longer than a feedback period of the CQI; and in the third information, a feedback period of the information about the pilot port used by the third network device is longer than a feedback period of the RI used by the third network device, the PMI used by the third network device, or the CQI, or in the third information, a feedback period of the information about the pilot port used by the third network device or the RI used by the third network device is longer than a feedback period of the PMI used by the third network device or the CQI, or in the third information, a feedback period of the information about the pilot port used by the third network device, the RI used by the third network device, or the PMI used by the third network device is longer than a feedback period of the CQI.

With reference to the fifth aspect, in still another possible implementation manner of the present invention, a period for feeding back the information about the pilot port used by the first network device in the second information is configured independently from a period for feeding back the RI used by the first network device, the PMI used by the first network device, or the CQI in the second information; or a period for feeding back the information about the pilot port used by the third network device in the third information is configured independently from a period for feeding back the RI used by the third network device, the PMI used by the third network device, or the CQI in the third information; or a period for feeding back the information about the pilot port used by the first network device in the second information is configured independently from a period for feeding back the RI used by the first network device, the PMI used by the first network device, or the CQI in the second information, and a period for feeding back the information about the pilot port used by the third network device in the third information is configured independently from a period for feeding back the RI used by the third network device, the PMI used by the third network device, or the CQI in the third information.

With reference to the fifth aspect, in still another possible implementation manner of the present invention, the first information further includes fourth information of the first network device when it is assumed that the first network device and the second network device perform single user multiple input multiple output SU-MIMO communication, and the fourth information includes at least one of configuration information of a pilot port used by the first network device, an RI used by the first network device, a PMI used by the first network device, or a CQI.

With reference to the fifth aspect, in still another possible implementation manner of the present invention, the first network device is first user equipment UE, the third network device is second UE, the second network device is a base station, and the base station controls communication of the first UE and communication of the second UE; or the first network device is a first secondary base station, the third network device is a second secondary base station, the second network device is a primary base station, and the primary base station controls communication of the first secondary base station and communication of the second secondary base station; or the first network device is first secondary UE, the third network device is second secondary UE, the second network device is primary UE, and the primary UE controls communication of the first secondary UE and communication of the second secondary UE.

According to a sixth aspect, an embodiment of the present invention provides a second network device, where the second network device includes:

a transmitter, configured to send pilot port configuration information, where the pilot port configuration information is used to describe at least two pilot ports; and a receiver, configured to receive first information fed back by a first network device, where the first information is determined by the first network device by measuring, by using the at least two pilot ports, a pilot signal sent by the second network device, the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, a rank indication RI used by the first network device, a precoding matrix indicator PMI used by the first network device, or a channel quality indicator CQI, and the third information includes at least one of information about a pilot port used by the third network device, an RI used by the third network device, a PMI used by the third network device, or a CQI.

According to a seventh aspect, an embodiment of the present invention provides a channel measurement and feedback system, where the system includes a first network device, a second network device, and a third network device, the first network device is the first network device described in the third aspect or the fourth aspect, and the second network device is the second network device described in the fifth aspect or the sixth aspect.

The technical solutions provided in the embodiments of the present invention have the following beneficial effects:

A pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
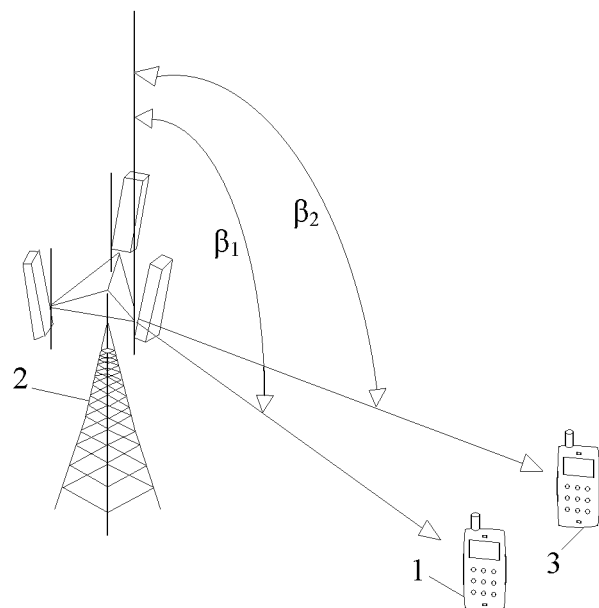
FIG. 1 is a diagram of an application scenario of a channel measurement and feedback method according to an embodiment of the present invention.

The following first simply describes, with reference to FIG. 1, an application scenario of a channel measurement and feedback method according to the embodiments of the present invention. As shown in FIG. 1, base station 2 serves at least two UEs (UE1 and UE 3) at the same time. Base station 2 may change a horizontal dimension and a vertical dimension of an antenna according to locations of the served UEs and by adjusting a weighting coefficient multiplied by transmission data, so that main lobes of beams emitted by the antenna aim at the UEs in three-dimensional (3D) space. For example, an included angle between a main lobe that aims at UE 1 and that is of a beam and a vertical direction is $\beta_1$, and an included angle between a main lobe that aims at UE 3 and that is of a beam and the vertical direction is $\beta_2$.

It should be noted that, the application scenario is merely an example, and the present invention is not limited thereto. For example, a primary base station serves at least two secondary base stations at the same time, or primary UE serves at least two secondary UEs at the same time.

Embodiment 1

Figure 2:
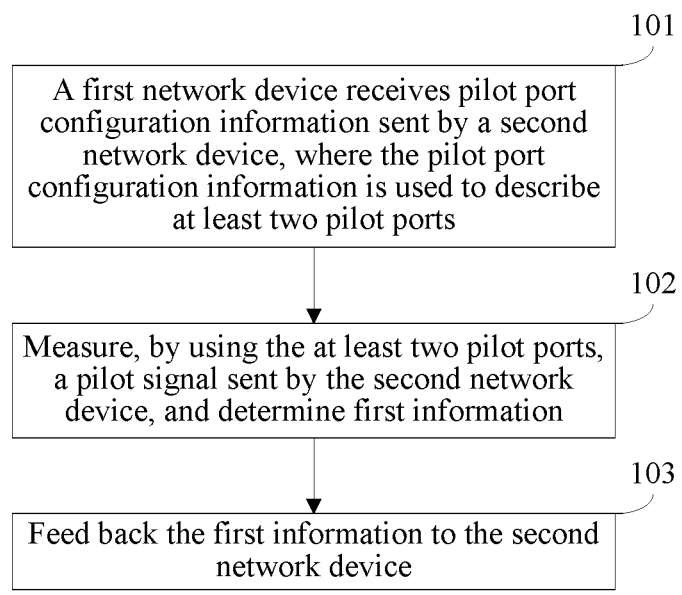
FIG. 2 is a flowchart of a channel measurement and feedback method according to Embodiment 1 of the present invention.

This embodiment of the present invention provides a channel measurement and feedback method. The method is executed by a first network device. Referring to FIG. 2, the method includes the following steps.

Step 101: The first network device receives pilot port configuration information sent by a second network device, where the pilot port configuration information is used to describe at least two pilot ports.

Specifically, the pilot port configuration information may include at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

Step 102: Measure, by using the at least two pilot ports, a pilot signal sent by the second network device, and determine first information.

The first information includes at least one of second information of the first network device or third information of a third network device when it is assumed that the first network device and the third network device communicate with the second network device by performing spatial multiplexing on a same time frequency resource. The second information includes at least one of information about a pilot port used by the first network device, a rank indication (Rank Indication, RI for short) used by the first network device, a precoding matrix indicator (Precoding Matrix Indicator, PMI for short) used by the first network device, or a channel quality indicator (Channel Quality Indicator, CQI for short). The third information includes at least one of information about a pilot port used by the third network device, an RI used by the third network device, a PMI used by the third network device, or a CQI.

It should be noted that, that the first network device and the third network device communicate with the second network device by performing spatial multiplexing on the same time frequency resource refers to: The first network device and the third network device communicate with the second network device by performing spatial multiplexing in a same physical resource block (Physical Resource Block, PRB for short). Because one PRB includes multiple resource elements (Resource Element, RE for short), when the first network device and the third network device communicate with the second network device by performing spatial multiplexing on the same time frequency resource, the first network device and the third network device may communicate with the second network device by performing spatial multiplexing in a same RE, or may communicate with the second network device by performing spatial multiplexing in different REs of a same PRB.

In an actual application, in a first case, the first network device is first UE (UE 1 shown in FIG. 1), the third network device is second UE (UE 3 shown in FIG. 1), and the second network device is a base station (base station 2 shown in FIG. 1), the base station controls communication of the first UE and communication of the second UE, and there is no primary-secondary relationship between the first UE and the second UE. In a second case, the first network device is a first secondary base station, the third network device is a second secondary base station, the second network device is a primary base station, and the primary base station controls communication of the first secondary base station and communication of the second secondary base station. For example, the primary base station is a macro base station, the first secondary base station is a micro base station, and the second secondary base station is another micro base station. In a third case, the first network device is first secondary UE, the third network device is second secondary UE, the second network device is primary UE, and the primary UE controls communication of the first secondary UE and communication of the second secondary UE.

Specifically, there may be one or more third network devices that perform spatial multiplexing on the same time frequency resource and communicate with the second network device as the first network device does. The second network device may obtain third information of all third network devices, or may obtain third information of some third network devices.

In an actual application, the second network device may send configuration information to the first network device, and the first network device determines, by using the configuration information, whether to start MU MIMO measurement and feedback (when it is assumed that the third network device and the first network device perform spatial multiplexing on the same time frequency resource and communicate with the second network device, measurement is performed and the first information is fed back). Meanwhile, the configuration information further includes a quantity of third network devices that perform spatial multiplexing on the same time frequency resource and communicate with the second network device as the first network device does. Specifically, the second network device may send the configuration information to the first network device independently, or may add the configuration information to the pilot port configuration information and send the pilot port configuration information to the first network device.

Step 103: Feed back the first information to the second network device.

It may be understood that after receiving the first information, the second network device may configure, according to the first information, scheduling information when the first network device and the third network device communicate with the second network device by performing spatial multiplexing on the same time frequency resource, so that the scheduling information is more accurate. The scheduling information is used for configuring the first network device and the third network device, so that the first network device and the third network device transmit data to the second network device.

Specifically, the second network device may configure the scheduling information in the following manners.

In a first case, the first information includes the second information and the third information. The second network device compares second information and third information sent by first network devices. When a match degree between second information sent by a first network device and third information sent by another first network device is the highest or is greater than a specified threshold, it means that performance that the two first network devices perform MU MIMO (perform spatial multiplexing transmission on the same time frequency resource) is relatively good. Therefore, the two first network devices are configured to network devices that communicate with the second network device by performing spatial multiplexing on the same time frequency resource, and the two first network devices are scheduled with reference to first information reported by the two first network devices.

For example, a PMI that is fed back by a first network device (UE 1 shown in FIG. 1) to the second network device (base station 2 shown in FIG. 1) and that is used by the first network device (UE 1) is PMI 1, and it is assumed that a PMI used by a third network device performing MU MIMO transmission to the first network device (UE 1) is PMI 2. A PMI that is fed back by another first network device (UE 3 shown in FIG. 1) to the second network device (that is, the base station) and that is used by the first network device (UE 3) is PMI 2, and it is assumed that a PMI used by a third network device performing MU MIMO transmission to the first network device (UE 3) is PMI 1. Therefore, the second network device may consider configuring the two first network devices (UE 1 and UE 3) to perform spatial multiplexing on a same time frequency resource and communicate with the second network device, the PMI used by UE 1 is PMI 1 and the PMI used by UE 3 is PMI 2.

In a second case, the first information includes the second information or the third information, the second network device may determine, by using a zero-forcing algorithm and according to second information or third information sent by first network devices, scheduling information that the first network devices perform spatial multiplexing on a same time frequency resource. For example, a precoding matrix corresponding to a PMI that is fed back by a first network device (UE 1 shown in FIG. 1) to the second network device (base station 2 shown in FIG. 1) and that is used by the first network device (that is, UE 1) is W 1, and a precoding matrix corresponding to a PMI that is fed back by another first network device (UE 3 shown in FIG. 1) to the second network device (that is, the base station) and that is used by the first network device (that is, UE 3) is W 2. The second network device determines, by using the zero-forcing algorithm and according to W 1 and W 2, that precoding matrices used by the two first network devices if the two first network devices perform spatial multiplexing on the same time frequency resource are respectively W 1' and W 2'. W 1' is a result obtained after W 1 is calculated by using the zero-forcing algorithm, and W 2' is a result obtained after W 2 is calculated by using the zero-forcing algorithm. The zero-forcing algorithm is an algorithm commonly known by a person skilled in the art, and details are not described herein.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 2

Figure 3:
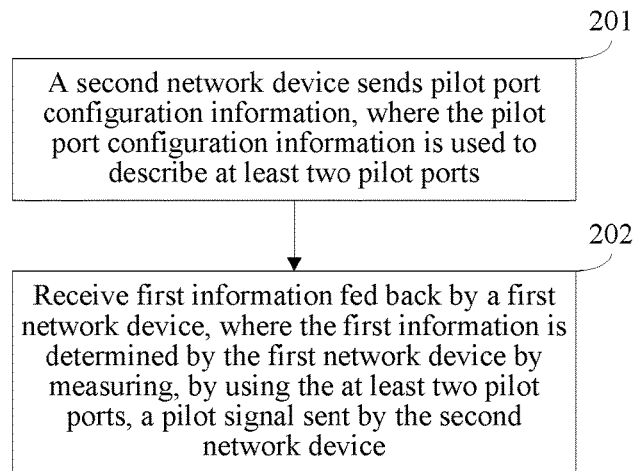
FIG. 3 is a flowchart of a channel measurement and feedback method according to Embodiment 2 of the present invention.

This embodiment of the present invention provides a channel measurement and feedback method. The method is executed by a second network device. Referring to FIG. 3, the method includes the following steps.

Step 201: The second network device sends pilot port configuration information, where the pilot port configuration information is used to describe at least two pilot ports.

Specifically, the pilot port configuration information may include at least one of a quantity of pilot ports, an identifier of a pilot port, a pilot pattern of a pilot signal of the pilot port, a pilot sequence of the pilot signal of the pilot port, a transmit power of the pilot signal of the pilot port, a transmit moment of the pilot signal of the pilot port, or a subband for transmitting the pilot signal of the pilot port.

Step 202: Receive first information fed back by a first network device, where the first information is determined by the first network device by measuring, by using the at least two pilot ports, a pilot signal sent by the second network device.

The first information includes at least one of second information of the first network device or third information of a third network device when it is assumed that the first network device and the third network device communicate with the second network device by performing spatial multiplexing on a same time frequency resource. The second information includes at least one of information about a pilot port used by the first network device, an RI used by the first network device, a PMI used by the first network device, or a CQI. The third information includes at least one of information about a pilot port used by the third network device, an RI used by the third network device, a PMI used by the third network device, or a CQI.

It should be noted that, that the first network device and the third network device communicate with the second network device by performing spatial multiplexing on the same time frequency resource refers to: The first network device and the third network device communicate with the second network device by performing spatial multiplexing in a same PRB. Because one PRB includes multiple REs, when the first network device and the third network device communicate with the second network device by performing spatial multiplexing on the same time frequency resource, the first network device and the third network device may communicate with the second network device by performing spatial multiplexing in a same RE, or may communicate with the second network device by performing spatial multiplexing in different REs of a same PRB.

In an actual application, in a first case, the first network device is first UE (UE 1 shown in FIG. 1), the third network device is second UE (UE 3 shown in FIG. 1), and the second network device is a base station (base station 2 shown in FIG. 1), the base station controls communication of the first UE and communication of the second UE, and there is no primary-secondary relationship between the first UE and the second UE. In a second case, the first network device is a first secondary base station, the third network device is a second secondary base station, the second network device is a primary base station, and the primary base station controls communication of the first secondary base station and communication of the second secondary base station. For example, the primary base station is a macro base station, the first secondary base station is a micro base station, and the second secondary base station is another micro base station. In a third case, the first network device is first secondary UE, the third network device is second secondary UE, the second network device is primary UE, and the primary UE controls communication of the first secondary UE and communication of the second secondary UE.

Specifically, there may be one or more third network devices that perform spatial multiplexing on the same time frequency resource and communicate with the second network device as the first network device does. The second network device may obtain third information of all third network devices, or may obtain third information of some third network devices.

In an actual application, the second network device may send configuration information to the first network device, and the first network device determines, by using the configuration information, whether to start MU MIMO measurement and feedback (when it is assumed that the third network device and the first network device perform spatial multiplexing on the same time frequency resource and communicate with the second network device, measurement is performed and the first information is fed back). Meanwhile, the configuration information further includes a quantity of third network devices that perform spatial multiplexing on the same time frequency resource and communicate with the second network device as the first network device does. Specifically, the second network device may send the configuration information to the first network device independently, or may add the configuration information to the pilot port configuration information and send the pilot port configuration information to the first network device.

It may be understood that after receiving the first information, the second network device may configure, according to the first information, scheduling information when the first network device and the third network device communicate with the second network device by performing spatial multiplexing on the same time frequency resource, so that the scheduling information is more accurate. The scheduling information is used for configuring the first network device and the third network device, so that the first network device and the third network device transmit data to the second network device.

Specifically, the second network device may configure the scheduling information in the following manners.

In a first case, the first information includes the second information and the third information. The second network device compares second information and third information sent by first network devices. When a match degree between second information sent by a first network device and third information sent by another first network device is the highest or is greater than a specified threshold, it means that performance that the two first network devices perform MU MIMO (perform spatial multiplexing transmission on the same time frequency resource) is relatively good. Therefore, the two first network devices are configured to network devices that communicate with the second network device by performing spatial multiplexing on the same time frequency resource, and the two first network devices are scheduled with reference to first information reported by the two first network devices.

For example, a PMI that is fed back by a first network device (UE 1 shown in FIG. 1) to the second network device (base station 2 shown in FIG. 1) and that is used by the first network device (UE 1) is PMI 1, and it is assumed that a PMI used by a third network device performing MU MIMO transmission to the first network device (UE 1) is PMI 2. A PMI that is fed back by another first network device (UE 3 shown in FIG. 1) to the second network device (that is, the base station) and that is used by the first network device (UE 3) is PMI 2, and it is assumed that a PMI used by a third network device performing MU MIMO transmission to the first network device (UE 3) is PMI 1. Therefore, the second network device may consider configuring the two first network devices (UE 1 and UE 3) to perform spatial multiplexing on a same time frequency resource and communicate with the second network device, the PMI used by UE 1 is PMI 1 and the PMI used by UE 3 is PMI 2.

In a second case, the first information includes the second information or the third information, the second network device may determine, by using a zero-forcing algorithm and according to second information or third information sent by first network devices, scheduling information that the first network devices perform spatial multiplexing on a same time frequency resource. For example, a precoding matrix corresponding to a PMI that is fed back by a first network device (UE 1 shown in FIG. 1) to the second network device (base station 2 shown in FIG. 1) and that is used by the first network device (that is, UE 1) is W 1, and a precoding matrix corresponding to a PMI that is fed back by another first network device (UE 3 shown in FIG. 1) to the second network device (that is, the base station) and that is used by the first network device (that is, UE 3) is W 2. The second network device determines, by using the zero-forcing algorithm and according to W 1 and W 2, that precoding matrices used by the two first network devices if the two first network devices perform spatial multiplexing on the same time frequency resource are respectively W 1' and W 2'. W 1' is a result obtained after W 1 is calculated by using the zero-forcing algorithm, and W 2' is a result obtained after W 2 is calculated by using the zero-forcing algorithm. The zero-forcing algorithm is an algorithm commonly known by a person skilled in the art, and details are not described herein.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 3

Figure 4:
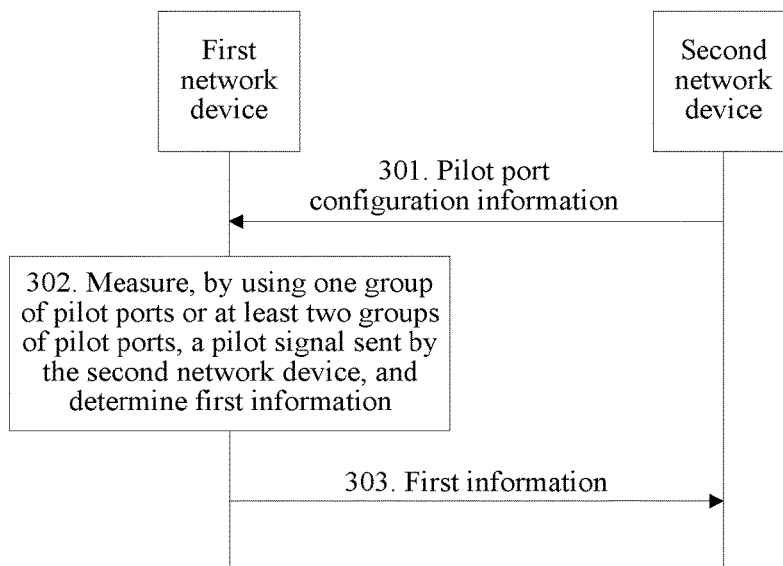
FIG. 4 is a flowchart of interaction of a channel measurement and feedback method according to Embodiment 3 of the present invention.

This embodiment of the present invention provides a channel measurement and feedback method. At least two pilot ports in this embodiment are one group of pilot ports or at least two groups of pilot ports. Referring to FIG. 4, the method includes the following steps.

Step 301: A second network device sends pilot port configuration information, where the pilot port configuration information is used to describe one group of pilot ports or at least two groups of pilot ports.

In this embodiment, each group of pilot ports is described by using the independently configured pilot port configuration information, and one group of pilot ports includes at least one pilot port. That is, the second network device may send one piece of pilot port configuration information or multiple pieces of pilot port configuration information. Independently configured pilot port configuration information is used to describe different groups of pilot ports.

Figure 5:
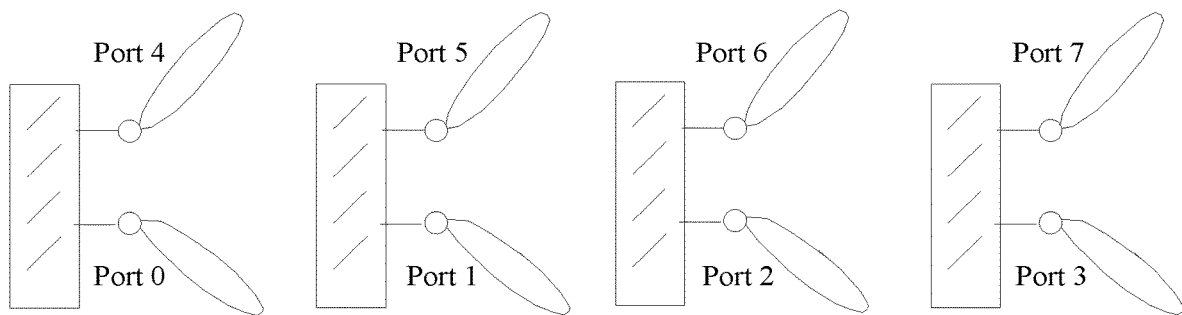
FIG. 5 is a schematic diagram of a relationship between an antenna of a base station and a main lobe of a beam according to Embodiment 3 of the present invention.

For example, referring to FIG. 5, every four antenna elements of 16 antenna elements (represented by using slashes in FIG. 5) form one group, and each group of antenna elements form two pilot ports (represented by using small circles in FIG. 5) by using two groups of weighting coefficients. For two pilot ports formed by a same group of antenna elements, antenna gains in a vertical direction are different and antenna gains in a horizontal direction are the same. Four groups of antenna elements form eight pilot ports port 0 to port 7 (port 0 to port 7). Two pilot ports that are formed by a same group of antenna elements and that have a same antenna gain in the horizontal direction are port 0 (port 0) and port 4 (port 4), port 1 (port 1) and port 5 (port 5), port 2 (port 2) and port 6 (port 6), or port 3 (port 3) and port 7 (port 7). The eight pilot ports may be divided into two groups according to different antenna gains in the vertical direction. The first group of pilot ports are port 0 to port 3 (port 0 to port 3), and the second group of pilot ports are port 4 to port 7 (port 4 to port 7). It should be noted that the pilot ports may be grouped according to different antenna gains in the horizontal direction, or according to another principle, and examples are not listed herein.

Network devices performing spatial multiplexing on a same time frequency resource may perform transmission by using antenna ports having different antenna gains, for example, by using antenna ports having different antenna gains in the vertical direction. UE 1 shown in FIG. 1 uses the first group of pilot ports (port 0 to port 3) and UE 3 shown in FIG. 1 uses the second group of pilot ports (port 4 to port 7). Alternatively, the network devices may perform transmission by using antenna ports having a same antenna gain in the vertical direction. For example, UE 1 and UE 3 both use the first group of pilot ports (port 0 to port 3), and perform spatial multiplexing by using different precoding matrices in the vertical direction. UE measures and feeds back information about ports used by the network devices that perform spatial multiplexing on the same time frequency resource, to assist a base station in MU MIMO scheduling, so that MU MIMO transmission performance is better.

Specifically, the groups of weighting coefficients may be weighting coefficients for a baseband, or may be weighting coefficients for a radio frequency driven network. That is, a pilot port may be formed by using a weighting coefficient for a baseband, or may be formed by using a weighting coefficient for a radio frequency driven network. Generally, an included angle between a main lobe of a transmit beam on a pilot port that is formed by using the weighting coefficient for the radio frequency driven network and the vertical direction is referred to as an electrical downtilt, that is, the electrical downtilt is relative to the radio frequency. In this case, an included angle between a largest antenna gain of the pilot port in the vertical direction and the vertical direction refers to the electrical downtilt. During baseband weighting, a pilot port formed by using the weighting coefficient for the baseband may be mapped to different radio frequency channels. One pilot port formed by using the weighting coefficient for the baseband may be mapped to one or more radio frequency channels, and the radio frequency channels are in one-to-one correspondence to the electrical downtilts. Therefore, the pilot port formed by using the weighting coefficient for the baseband has different electrical downtilts, that is, the electrical downtilt may be relative to the baseband.

In an implementation manner of this embodiment, the independently configured pilot port configuration information may be in one-to-one correspondence to configuration information of a channel state information process (Channel Status Indicator process, CSI process for short). Configuration information of each CSI process includes configuration information of a non-zero power channel state information-reference signal (Channel State Indicating Reference Signal, CSI-RS for short) and configuration information of a channel state information interference measurement reference signal (Channel State Information Interference Measurement reference signal, CSI-IM for short). Specifically, the configuration information of the CSI process is sent by the second network device to the first network device, and the first network device determines a CSI-RS port and a CSI-IM port according to the received configuration information of the CSI process. For example, for CSI process 1, the CSI-RS port is configured to port 0 to port 3 (port 0 to port 3) and the CSI-IM port is configured to port 8 to port 11 (port 8 to port 11). For CSI process 2, the CSI-RS port is configured to port 4 to port 7 (port 4 to port 7), and the CSI-IM port is configured to port 12 to port 15 (port 12 to port 15). Meanwhile, for each CSI process, a ratio of a data signal to a CSI-RS may be configured. For CSI process 1, the ratio of the data signal to the CSI-RS is configured to $\rho_{c1}$, and for CSI process 2, the ratio of the data signal to the CSI-RS is configured to $\rho_{c2}$. Further, for each CSI process, multiple ratios of the data signal to the CSI-RS may be configured, and the UE selects one from the multiple ratios and reports the ratio in the first information.

In another implementation manner of this embodiment, each piece of independently configured pilot port configuration information may include configuration information of a non-zero power CSI-RS and configuration information of a zero power CSI-RS.

In still another implementation manner of this embodiment, each piece of independently configured pilot port configuration information may include configuration information of a CRS.

Optionally, step 301 may include:

sending, by the second network device, downlink control information (Downlink Control Information, DCI for short), where the DCI includes the pilot port configuration information.

Step 302: A first network device measures, by using the one group of pilot ports or the at least two groups of pilot ports, a pilot signal sent by the second network device, and determines first information.

The first information includes at least one of second information of the first network device or third information of a third network device when it is assumed that the first network device and the third network device communicate with the second network device by performing spatial multiplexing on the same time frequency resource. The second information includes at least one of information about a pilot port used by the first network device, an RI used by the first network device, a PMI used by the first network device, or a CQI. The third information includes at least one of information about a pilot port used by the third network device, an RI used by the third network device, a PMI used by the third network device, or a CQI.

It should be noted that, that the first network device and the third network device communicate with the second network device by performing spatial multiplexing on the same time frequency resource refers to: The first network device and the third network device communicate with the second network device in a same physical resource block (Physical Resource Block, PRB for short). Because one PRB includes multiple resource elements (Resource Element, RE for short), when the first network device and the third network device communicate with the second network device by performing spatial multiplexing on the same time frequency resource, the first network device and the third network device may communicate with the second network device in a same RE, or may communicate with the second network device in different REs of a same PRB.

In an implementation manner of this embodiment, when the at least two pilot ports are the one group of pilot ports, the information about the pilot port used by the first network device in the second information may include a port number of at least one pilot port selected by the first network device for the first network device in the one group of pilot ports, and the information about the pilot port used by the third network device in the third information may include a port number of at least one pilot port selected by the first network device for the third network device in the one group of pilot ports; or when the at least two pilot ports are the at least two groups of pilot ports, the information about the pilot port used by the first network device in the first information may include a group number of at least one group of pilot ports selected by the first network device for the first network device in the at least two groups of pilot ports, and the information about the pilot port used by the third network device in the third information may include a group number of at least one group of pilot ports selected by the first network device for the third network device in the at least two groups of pilot ports.

In another implementation manner of this embodiment, if the independently configured pilot port configuration information is in one-to-one correspondence to the configuration information of the CSI process, when the at least two pilot ports are the one group of pilot ports, the information about the pilot port used by the first network device in the second information may include a port number of at least one pilot port selected by the first network device for the first network device in the one group of pilot ports, and the information about the pilot port used by the third network device in the third information may include a port number of at least one pilot port selected by the first network device for the third network device in the one group of pilot ports; or when the at least two pilot ports are the at least two groups of pilot ports, the information about the pilot port used by the first network device in the first information may include a process number of a CSI process corresponding to at least one group of pilot ports selected by the first network device for the first network device in the at least two groups of pilot ports, and the information about the pilot port used by the third network device in the third information may include a process number of a CSI process corresponding to at least one group of pilot ports selected by the first network device for the third network device in the at least two groups of pilot ports.

In still another implementation manner of this embodiment, step 302 may include:

measuring, by the first network device by using each pilot port in the one group of pilot ports or the at least two groups of pilot ports, the pilot signal sent by the second network device, to obtain a channel coefficient corresponding to the pilot port;

enabling channel coefficients corresponding to pilot ports in each group of pilot ports to form a channel coefficient matrix corresponding to the group of pilot ports;

multiplying the channel coefficient matrix corresponding to each group of pilot ports by each precoding matrix in a precoding matrix set corresponding to each group of pilot ports, to obtain an equivalent channel coefficient matrix;

respectively calculating a signal to interference plus noise ratio (Signal to Interference plus Noise Ratio, SINR for short) when the first network device and the third network device use the equivalent channel coefficient matrices;

selecting a largest SINR from all calculated SINRs; and determining the first information according to the largest SINR, where the CQI is determined according to a specified correspondence between the SINR and the CQI, the information about the pilot port used by the first network device is information about a pilot port corresponding to an equivalent channel coefficient matrix used by the first network device when the largest SINR is calculated, the PMI used by the first network device is a PMI corresponding to the equivalent channel coefficient matrix used by the first network device when the largest SINR is calculated, the RI used by the first network device is a rank of a precoding matrix corresponding to the equivalent channel coefficient matrix used by the first network device when the largest SINR is calculated, the information about the pilot port used by the third network device is information about a pilot port corresponding to an equivalent channel coefficient matrix used by the third network device when the largest SINR is calculated, the PMI used by the third network device is a PMI corresponding to the equivalent channel coefficient matrix used by the third network device when the largest SINR is calculated, and the RI used by the third network device is a rank of a precoding matrix corresponding to the equivalent channel coefficient matrix used by the third network device when the largest SINR is calculated.

For example, when the largest SINR is calculated, the equivalent channel coefficient matrix used by the first network device is $H^p * W_r^p$, and the equivalent channel coefficient matrix used by the third network device is $H^q * W_t^q$. The p may be equal to q. $H^p$ represents a channel coefficient matrix corresponding the $p^{th}$ group of pilot ports, $W_r^p$ represents the $r^{th}$ precoding matrix in a precoding matrix set corresponding the $p^{th}$ group of pilot ports, $H^q$ represents a channel coefficient matrix corresponding the $q^{th}$ group of pilot ports, and $W_t^q$ represents the $t^{th}$ precoding matrix in a precoding matrix set corresponding the $q^{th}$ group of pilot ports. Therefore, the information about the pilot port used by the first network device is a group number p of the $p^{th}$ group of pilot ports, the PMI used by the first network device is an index of the precoding matrix $W_r^p$, the RI used by the first network device is a rank of the precoding matrix $W_r^p$, the information about the pilot port used by the third network device is a group number q of the $q^{th}$ group of pilot ports, the PMI used by the third network device is an index of the precoding matrix $W_t^q$, and the RI used by the third network device is a rank of the precoding matrix $W_t^q$.

Specifically, quantities of precoding matrices in precoding matrix sets in one-to-one correspondence to the groups of pilot ports are integers greater than 1. The precoding matrix sets in one-to-one correspondence to the groups of pilot ports include a precoding matrix having a rank of 1, or the precoding matrix sets in one-to-one correspondence to the groups of pilot ports may include a precoding matrix having a rank greater than 1.

The following specifically describes step 302 with reference to an example. Assuming that the pilot port configuration information sent by the second network device is used to describe M groups of pilot ports, a quantity of pilot ports in the $m^{th}$ group (any group of pilot ports in the M groups of pilot ports) of pilot port is $V_m$, $1 \le m \le M$, m is an integer, and a quantity of receive antennas of the first network device is $V_{RX}$, a channel coefficient matrix $H^m$ corresponding to the $m^{th}$ group of pilot ports is as follows:

$$H^m = \begin{bmatrix} h_{00}^m & h_{01}^m & \cdots & h_{0(V_m-1)}^m \\ h_{10}^m & h_{11}^m & \cdots & h_{1(V_m-1)}^m \\ \vdots & \vdots & \cdots & \vdots \\ h_{(V_{RX}-1)0}^m & h_{(V_{RX}-1)1}^m & \cdots & h_{(V_{RX}-1)(V_m-1)}^m \end{bmatrix}$$

where $h_{ij}^m$ is a channel coefficient obtained by the $i^{th}$ receive antenna by using the $j^{th}$ pilot port in the $m^{th}$ group of pilot ports, $0 \le i \le V_{RX}$, i is an integer, $0 \le j \le V_m$, and j is an integer.

A quantity of precoding matrices in a precoding matrix set $\{W_k^m\}$ corresponding to the $m^{th}$ group of pilot ports is $K^m$, $W_k^m$ represents the $k^{th}$ precoding matrix (any precoding matrix in the precoding matrix set corresponding to the $m^{th}$ group of pilot ports) in the precoding matrix set corresponding to the $m^{th}$ group of pilot ports, $1 \le k \le K^m$, and k is an integer.

Each group of pilot ports in the M groups of pilot ports is traversed. When each group of pilot ports is traversed, each precoding matrix in a precoding matrix set corresponding to each group of pilot ports is traversed, and when each precoding matrix is traversed, a channel coefficient matrix corresponding to a group of traversed pilot port is multiplied by a traversed precoding matrix, to obtain an equivalent channel coefficient matrix. That is, based on that the $m^{th}$ group of pilot ports (any group of pilot ports in the M groups of pilot ports) is traversed, when the $k^m$ precoding matrix (any precoding matrix in the precoding matrix set corresponding to the $m^{th}$ group of pilot ports) in the precoding matrix set corresponding to the $m^{th}$ group of pilot ports is traversed, the $m^{th}$ channel coefficient matrix $H^m$ is multiplied by the $k^m$ precoding matrix $W_k^m$ in the precoding matrix set $\{W_k^m\}$ corresponding to the $m^{th}$ group of pilot ports, to obtain the equivalent channel coefficient matrix $H^m * W_k^m$.

An SINR when the first network device and the third network device use each equivalent channel coefficient matrix is calculated. For example, it is assumed that the first network device uses an equivalent channel coefficient matrix $H_p * W_r^p$ that is obtained by multiplying a channel coefficient matrix $H^p$ corresponding to the $p^{th}$ group of pilot ports by the $r^{th}$ precoding matrix $W_r^p$ in a precoding matrix set $\{W_r^p\}$ corresponding to the $p^{th}$ group of pilot ports, and the third network device uses an equivalent channel coefficient matrix $H^q*W_t^q$ that is obtained by multiplying a channel coefficient matrix $H^q$ corresponding to the $q^{th}$ group of pilot ports by the $t^{th}$ precoding matrix $W_t^q$ in a precoding matrix set $\{W_t^q\}$ corresponding to the $q^{th}$ group of pilot ports, where $1 \leq p \leq M$, p is an integer, $1 \leq t \leq K^p$, t is an integer, $K^p$ is a quantity of precoding matrix sets corresponding to the $p^{th}$ group of pilot ports, $1 \leq q \leq M$, q is an integer, $1 \leq t \leq K^q$, t is an integer, and $K^q$ is a quantity of precoding matrix sets corresponding to the $q^{th}$ group of pilot ports. In this case, a signal received by the first network device is $y = H^p*W_r^p*s_1 + H^q*W_t^q*s_3 + n$, where $s_1$ is a signal that the first network device communicates with the second network device, $s_3$ is a signal that the third network device communicates with the second network device, and n is noise. In addition, $s_1$ and $s_3$ may include power information (for example, a power ratio of a data signal to a pilot signal). For example, $s_1 = n*S$, where n is a power value and S is signal content.

Weighting values for a received signal are different according to different receiver algorithms (for example, minimum mean square error (Minimum Mean Square Error, MMSE for short) or maximum likelihood (Maximum Likelihood, ML for short).

For example, for MMSE, a weighting value P for the received signal may be calculated by using the following formula:

$$H = [H^p*W_r^p, H^q*W_t^q];$$

$$y = H*x + n;$$

$$x = P*y;$$

$$P = H^p*W_r^p*(H*H^H + \sigma^2*I_{V_{RX}});$$

where H is a matrix formed by an equivalent channel coefficient matrix, $H^p*W_r^p$ is an equivalent channel coefficient matrix used by the first network device, $H^q*W_t^q$ is an equivalent coefficient matrix used by the third network device, y is a received signal, x is a transmit signal, n is noise, $H^H$ represents a transposed-conjugate matrix of the matrix H, $\sigma^2$ is a variance of noise, and $I_{V_{RX}}$ represents a unit matrix of $V_{RX}$.

Assuming that the weighting value of the first network device for the received signal is P, and P is a vector whose dimension is equal to the quantity $V_{RX}$ of receive antennas, a processed signal is $y' = P*H^p*W_r^p*s_1 + P*H^q*W_t^q*s_3 + P*n$. In this case, the SINR may be calculated by using the following formula:

$$SINR = \frac{\|P^**H^{p*}W_r^{p*}s_1\|_2}{(\|P^**H^{q*}W_t^{q*}s_3\|_2 + \|P\|_2 *\sigma^{2*}I_{V_{RX}})};$$

where $\|*\|_2$ represents obtaining a square root of a sum of squares of elements in a matrix *, $H^p*W_r^p$ is the equivalent channel coefficient matrix used by the first network device, $H^q*W_t^q$ represents the equivalent coefficient matrix used by the third network device, $s_1$ is the signal that the first network device communicates with the second network device, $s_3$ is the signal that the third network device communicates with the second network device, $\sigma^2$ is the variance of the noise, and $I_{V_{RX}}$ represents the unit matrix of $V_{RX}$.

The largest SINR is selected from all calculated SINRs. When $s_1$ and $s_3$ include multiple power ratios of the data signal to the pilot signal (or transmit powers of the pilot signal), when the groups of pilot ports and the precoding matrices in the precoding matrix sets corresponding to the groups of pilot ports are traversed, the power ratios of the data signal to the pilot signal (or the transmit power of the pilot signal) further need to be traversed.

After the largest SINR is selected, the equivalent channel coefficient matrix used by the first network device and the equivalent channel coefficient matrix used by the third network device when the largest SINR is obtained may be determined. It is still assumed that the first network device uses the equivalent channel coefficient matrix $H^p*W_r^p$ and the third network device uses the equivalent channel coefficient matrix $H^q*W_t^q$. In this case, the information about the pilot port used by the first network device in the second information includes the group number p of the $p^{th}$ group of pilot ports, the PMI used by the first network device is the index of the precoding matrix $W_r^p$, the RI used by the first network device is the rank of the precoding matrix $W_r^p$, the CQI is a CQI corresponding to the largest SINR in the correspondence between the SINR and the CQI, the information about the pilot port used by the third network device in the third information includes the group number q of the $q^{th}$ group of pilot ports, the PMI used by the third network device is the index of the precoding matrix $W_t^q$, the RI used by the third network device is the rank of the precoding matrix $W_t^q$, and the CQI is a CQI corresponding to the largest SINR in the correspondence between the SINR and the CQI.

In addition, the information about the pilot port used by the first network device further includes at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device further includes at least one of a subband for transmitting a pilot signal of the pilot port used by the third network device, a pilot sequence of the pilot signal of the pilot port used by the third network device, or a transmit power of the pilot signal of the pilot port used by the third network device.

During specific implementation, if any of the foregoing information further needs to be determined, the corresponding information may be traversed according to the foregoing examples. For example, when the information about the pilot port used by the first network device further includes a subband for transmitting by using the pilot port used by the first network device, subbands may be traversed, to find the subband used by the first network device and corresponding to the largest SINR. For another example, when the information about the pilot port used by the first network device further includes the pilot sequence of the pilot signal of the pilot port used by the first network device, pilot sequences may be traversed, to find the pilot sequence used by the first network device and corresponding to the largest SINR.

It may be understood that in the foregoing example, the first information is determined by using a principle that an SINR is maximum. In an actual application, the first information may be determined by using a principle that a throughput is maximum, and details are not described herein.

Optionally, the pilot port configuration information may further include indication information, and the indication information is used to indicate pilot port configuration information belonging to the first network device and pilot port configuration information belonging to the third network device. It may be understood that when the pilot port configuration information includes the indication information, when the SINR is calculated by means of traversing, the groups of pilot ports do not need to be traversed, and only precoding matrices in a precoding matrix set corresponding to a group of pilot ports used by the first network device and precoding matrices in a precoding matrix set corresponding to a group of pilot ports used by the third network device need to be traversed according to the indication information.

Step 303: The first network device feeds back the first information to the second network device.

Optionally, a feedback mode of the second information may be different from a feedback mode of the third information. The second network device independently configures the feedback mode of the second information and the feedback mode of the third information. The feedback modes include subband feedback and broadband feedback. The subband feedback is separately feeding back one piece of second information or third information for each subband, and the broadband feedback is feeding back one piece of second information or third information for all subbands.

In an actual application, a frequency domain for signal transmission may be divided into several sub frequency bands (briefly referred to as subbands). Multiple subbands form a broadband. Because pilot signals are sent in an entire frequency domain, pilot signals in the subbands are separately measured, to determine channel quality. Second information and third information that are determined directly according to channel quality corresponding to the subbands are fed back to the second network device in a manner of the subband feedback. First, an average of channel quality corresponding to the subbands is obtained, and second information and third information that are determined according to the average of the channel quality corresponding to multiple subbands (that is, broadband) are fed back to the second network device in a manner of the broadband feedback.

Because an amount of information transmitted by the first network device is limited, the first network device generally may feed back a part of first information in the manner of the broadband feedback. Meanwhile, because the subband feedback is feedback for each subband, and the broadband feedback is feedback for all subbands, accuracy of the subband feedback is higher than accuracy of the broadband feedback, and relatively important information in the first information is fed back in the manner of the subband feedback.

Preferably, the feedback mode of the second information may be the subband feedback, and the feedback mode of the third information may be the broadband feedback.

In an actual application, in the second information, feedback modes of the information about the pilot port used by the first network device, the RI used by the first network device, and the PMI used by the first network device may be the broadband feedback, and a feedback mode of the CQI may be the subband feedback; or in the third information, feedback modes of the information about the pilot port used by the third network device, the RI used by the third network device, and the PMI used by the third network device may be the broadband feedback, and a feedback mode of the CQI may be the subband feedback; or in the second information, feedback modes of the information about the pilot port used by the first network device, the RI used by the first network device, and the PMI used by the first network device may be the broadband feedback, and a feedback mode of the CQI may be the subband feedback, and meanwhile, in the third information, feedback modes of the information about the pilot port used by the third network device, the RI used by the third network device, and the PMI used by the third network device may be the broadband feedback, and a feedback mode of the CQI may be the subband feedback.

Alternatively, in the second information, feedback modes of the information about the pilot port used by the first network device and the RI used by the first network device may be the broadband feedback, and feedback modes of the PMI used by the first network device and the CQI may be the subband feedback; or in the third information, feedback modes of the information about the pilot port used by the third network device and the RI used by the third network device may be the broadband feedback, and feedback modes of the PMI used by the third network device and the CQI may be the subband feedback; or in the second information, feedback modes of the information about the pilot port used by the first network device and the RI used by the first network device may be the broadband feedback, and feedback modes of the PMI used by the first network device and the CQI may be the subband feedback, and meanwhile, in the third information, feedback modes of the information about the pilot port used by the third network device and the RI used by the third network device may be the broadband feedback, and feedback modes of the PMI used by the third network device and the CQI may be the subband feedback.

Alternatively, in the second information, a feedback mode of the information about the pilot port used by the first network device may be the broadband feedback, and feedback modes of the RI used by the first network device, the PMI used by the first network device, and the CQI may be the subband feedback; or in the third information, a feedback mode of the information about the pilot port used by the third network device may be the broadband feedback, and feedback modes of the RI used by the third network device, the PMI used by the third network device, and the CQI may be the subband feedback; or in the second information, a feedback mode of the information about the pilot port used by the first network device may be the broadband feedback, and feedback modes of the RI used by the first network device, the PMI used by the first network device, and the CQI may be the subband feedback, and meanwhile, in the third information, a feedback mode of the information about the pilot port used by the third network device may be the broadband feedback, and feedback modes of the RI used by the third network device, the PMI used by the third network device, and the CQI may be the subband feedback.

Alternatively, feedback modes of the information about the pilot port used by the first network device, the RI used by the first network device, the PMI used by the first network device, and the CQI in the second information may be the subband feedback, and a subband for the information about the pilot port used by the first network device may be different from a subband for at least one of the RI used by the first network device, the PMI used by the first network device, or the CQI (for example, the subband for the information about the pilot port used by the first network device is 1 M, and subbands of the RI used by the first network device, the PMI used by the first network device, and the CQI are all 0.5 M). Alternatively, feedback modes of the information about the pilot port used by the third network device, the RI used by the third network device, the PMI used by the third network device, and the CQI in the third information may be the subband feedback, a subband for the information about the pilot port used by the third network device may be different from a subband for at least one of the RI used by the third network device, the PMI used by the third network device, or the CQI. Alternatively, feedback modes of the information about the pilot port used by the first network device, the RI used by the first network device, the PMI used by the first network device, and the CQI in the second information may be the subband feedback, and a subband for the information about the pilot port used by the first network device may be different from a subband for at least one of the RI used by the first network device, the PMI used by the first network device, or the CQI, and meanwhile, feedback modes of the information about the pilot port used by the third network device, the RI used by the third network device, the PMI used by the third network device, and the CQI in the third information may be the subband feedback, a subband for the information about the pilot port used by the third network device may be different from a subband for at least one of the RI used by the third network device, the PMI used by the third network device, or the CQI.

Specifically, the subband for feeding back the information about the pilot port used by the first network device in the second information may be configured independently from the a subband for feeding back the RI used by the first network device, the PMI used by the first network device, or the CQI in the second information (for example, the subband for the information about the pilot port used by the first network device is 1 M, and the subbands for the RI used by the first network device, the PMI used by the first network device, and the CQI are all 0.5 M); or the subband for feeding back the information about the pilot port used by the third network device in the third information may be configured independently from the a subband for feeding back the RI used by the third network device, the PMI used by the third network device, or the CQI in the third information; or the subband for feeding back the information about the pilot port used by the first network device in the second information may be configured independently from the a subband for feeding back the RI used by the first network device, the PMI used by the first network device, or the CQI in the second information, and the subband for feeding back the information about the pilot port used by the third network device in the third information may be configured independently from the a subband for feeding back the RI used by the third network device, the PMI used by the third network device, or the CQI in the third information.

Optionally, a feedback period of the second information may be different from a feedback period of the third information, and the second network device independently configures the feedback period of the second information and the feedback period of the third information.

Similarly, because an amount of information transmitted by the first network device is limited, the first network device may set a relatively short feedback period for relatively important information in the first information, and set a relatively long feedback period for information having relatively low importance in the first information.

Preferably, the feedback period of the second information is shorter than the feedback period of the third information. For example, the feedback period of the second information is 5 ms, and the feedback period of the third information is 10 ms.

In an actual application, in the second information, a feedback period of the information about the pilot port used by the first network device is longer than a feedback period of the RI used by the first network device, the PMI used by the first network device, or the CQI; or in the third information, a feedback period of the information about the pilot port used by the third network device is longer than a feedback period of the RI used by the third network device, the PMI used by the third network device, or the CQI; or in the second information, a feedback period of the information about the pilot port used by the first network device is longer than a feedback period of the RI used by the first network device, the PMI used by the first network device, or the CQI, and meanwhile, in the third information, a feedback period of the information about the pilot port used by the third network device is longer than a feedback period of the RI used by the third network device, the PMI used by the third network device, or the CQI.

Alternatively, in the second information, a feedback period of the information about the pilot port used by the first network device or the RI used by the first network device is longer than a feedback period of the PMI used by the first network device or the CQI; or in the third information, a feedback period of the information about the pilot port used by the third network device or the RI used by the third network device is longer than a feedback period of the PMI used by the third network device or the CQI; or in the second information, a feedback period of the information about the pilot port used by the first network device or the RI used by the first network device is longer than a feedback period of the PMI used by the first network device or the CQI, and meanwhile, in the third information, a feedback period of the information about the pilot port used by the third network device or the RI used by the third network device is longer than a feedback period of the PMI used by the third network device or the CQI.

Alternatively, in the second information, a feedback period of the information about the pilot port used by the first network device, the RI used by the first network device, or the PMI used by the first network device is longer than a feedback period of the CQI; or in the third information, a feedback period of the information about the pilot port used by the third network device, the RI used by the third network device, or the PMI used by the third network device is longer than a feedback period of the CQI; or in the second information, a feedback period of the information about the pilot port used by the first network device, the RI used by the first network device, or the PMI used by the first network device is longer than a feedback period of the CQI, and meanwhile, in the third information, a feedback period of the information about the pilot port used by the third network device, the RI used by the third network device, or the PMI used by the third network device is longer than a feedback period of the CQI.

Specifically, the period for feeding back the information about the pilot port used by the first network device in the second information may be configured independently from the a period for feeding back the RI used by the first network device, the PMI used by the first network device, or the CQI in the second information (for example, the period for feeding back the information about the pilot port used by the first network device is 10 ms, and the periods for feeding back the RI used by the first network device, the PMI used by the first network device, and the CQI are all 5 ms); or the period for feeding back the information about the pilot port used by the third network device in the third information may be configured independently from the a period for feeding back the RI used by the third network device, the PMI used by the third network device, or the CQI in the third information; or the period for feeding back the information about the pilot port used by the first network device in the second information may be configured independently from the a period for feeding back the RI used by the first network device, the PMI used by the first network device, or the CQI in the second information, and the period for feeding back the information about the pilot port used by the third network device in the third information may be configured independently from the a period for feeding back the RI used by the third network device, the PMI used by the third network device, or the CQI in the third information.

In still another implementation manner of the this embodiment, the first information may further include fourth information of the first network device when it is assumed that the first network device and the second network device perform single user multiple input multiple output (Single User Multiple Input Multiple Output, SU-MIMO for short) communication, and the fourth information includes at least one of configuration information of a pilot port used by the first network device, an RI used by the first network device, a PMI used by the first network device, or a CQI.

It may be understood that because the first network device and the second network device may perform SU-MIMO communication, the first information may further include the fourth information.

Optionally, when the first information includes the second information, the third information, and the fourth information, if a sum of information amounts of the second information, the third information, and the fourth information is greater than a largest amount of information transmitted by the first network device, the first network device discards the fourth information preferentially to the third information, and discards the third information preferentially to the second information.

Optionally, when the first information includes the second information, the third information, and the fourth information, if a sum of information amounts of the second information, the third information, and the fourth information is greater than a largest amount of information transmitted by the first network device, the first network device discards the fourth information preferentially to the second information, and discards the second information preferentially to the third information.

Optionally, when the first information includes the second information, the third information, and the fourth information, if a sum of information amounts of the second information, the third information, and the fourth information is greater than a largest amount of information transmitted by the first network device, the first network device discards the second information preferentially to the third information, and discards the third information preferentially to the fourth information.

Optionally, when the first information includes the second information, the third information, and the fourth information, if a sum of information amounts of the second information, the third information, and the fourth information is greater than a largest amount of information transmitted by the first network device, the first network device discards the second information preferentially to the fourth information, and discards the fourth information preferentially to the third information.

Optionally, when the first information includes the second information, the third information, and the fourth information, if a sum of information amounts of the second information, the third information, and the fourth information is greater than a largest amount of information transmitted by the first network device, the first network device discards the third information preferentially to the second information, and discards the second information preferentially to the fourth information.

Optionally, when the first information includes the second information, the third information, and the fourth information, if a sum of information amounts of the second information, the third information, and the fourth information is greater than a largest amount of information transmitted by the first network device, the first network device discards the third information preferentially to the fourth information, and discards the fourth information preferentially to the second information.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 4

Figure 6:
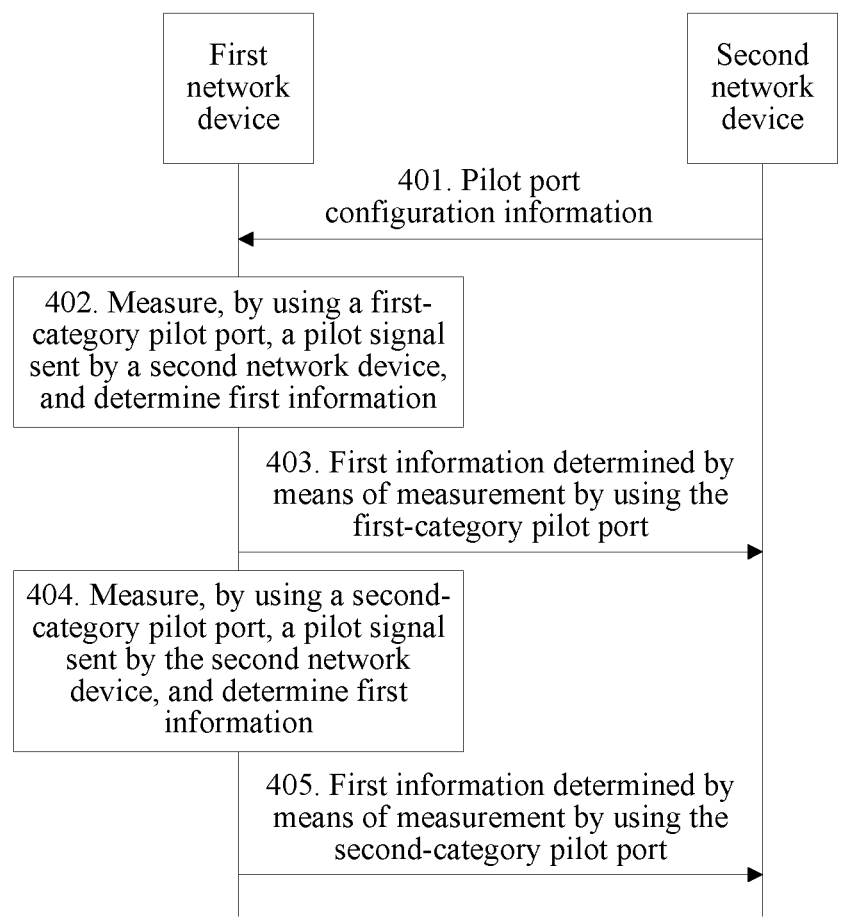
FIG. 6 is a flowchart of interaction of a channel measurement and feedback method according to Embodiment 4 of the present invention.

This embodiment of the present invention provides a channel measurement and feedback method. At least two pilot ports in this embodiment include a first-category pilot port and a second-category pilot port. Referring to FIG. 6, the method includes the following steps.

Step 401: A second network device sends pilot port configuration information, where the pilot port configuration information is used to describe at least two pilot ports, and the at least two pilot ports include a first-category pilot port and a second-category pilot port.

In this embodiment, the first-category pilot port includes at least one group of pilot ports, and the second-category pilot port includes at least two pilot ports. Each group of pilot ports is described by using the independently configured pilot port configuration information, and one group of pilot ports includes at least two pilot ports.

In a first implementation manner of this embodiment, the first-category pilot port may be a pilot port of a periodically sent pilot signal, and the second-category pilot port may be a pilot port of an aperiodically sent pilot signal.

In a second implementation manner of this embodiment, the first-category pilot port may be a pilot port configured by using radio resource control (Radio Resource Control, RRC for short) signaling, the second-category pilot port may be a pilot port configured by using downlink control signaling, and the downlink control signaling is downlink scheduling DL grant signaling or uplink scheduling UL grant signaling.

In a third implementation manner of this embodiment, the first-category pilot port may be a pilot port of a pilot signal that is not precoded, and the second-category pilot port may be a pilot port of a precoded pilot signal.

In a fourth implementation manner of this embodiment, the first-category pilot port may be a CRS pilot port or CSI-RS pilot port, and the second-category pilot port may be a demodulation reference signal (Demodulation Reference Signal, DMRS for short) pilot port.

In a fifth implementation manner of this embodiment, the first-category pilot port may be a pilot port of pilot signals sent in all subbands, and the second-category pilot port may be a pilot port of a pilot signal sent in a specified subband.

In a sixth implementation manner of this embodiment, a subband for transmitting a pilot signal by using the first-category pilot port may be fixed, and a subband for transmitting a pilot signal by using the second-category pilot port may be variable.

In an implementation manner of this embodiment, step 401 may include:

simultaneously sending, by the second network device, pilot port configuration information used to describe the first-category pilot port and pilot port configuration information used to describe the second-category pilot port.

In another implementation manner of this embodiment, step 401 may include:

separately sending, by the second network device, pilot port configuration information used to describe the first-category pilot port and pilot port configuration information used to describe the second-category pilot port.

During specific implementation, the second network device may first send the pilot port configuration information of the first-category pilot port, the first network device measures the pilot signal of the first-category pilot port by using the first-category pilot port, determines first information, and feeds back the first information to the second network device (for details, refer to step 402 and step 403). Then, the first network device sends the configuration information of the second-category pilot port, and the first network device measures the pilot signal of the second-category pilot port by using the second-category pilot port, determines first information, and feeds back the first information to the second network device (for details, refer to step 404 and step 405). The pilot port configuration information of the second-category pilot port may be obtained by the second network device according to the first information determined by means of measurement by using the first-category pilot port, the pilot signal of the second-category pilot port is a precoded pilot signal, and a PMI used for precoding may be determined by the second network device according to the first information determined by means of measurement by using the first-category pilot port. In addition, when the first information is determined by using the first-category pilot port, a subband for transmitting a pilot signal of a pilot port used by the first network device and a subband for transmitting a pilot signal of a pilot port used by the third network device may be determined. The pilot signal of the second-category pilot port may be sent in the subband that is determined when the first information is determined by means of measurement by using the first-category pilot port. That is, measurement by using the second-category pilot port is more accurate measurement, calculation, and feedback based on measurement by using the first-category pilot port, thereby improving accuracy of the first information.

Optionally, step 401 may include:

sending, by the second network device, DCI, where the DCI includes the pilot port configuration information used to describe the first-category pilot port or the pilot port configuration information used to describe the second-category pilot port.

Preferably, a sending mode of the first-category pilot port may be broadband sending, and a sending mode of the second-category pilot port may be subband sending. Broadband sending is sending pilot signals in all subbands, and subband sending is sending a pilot signal in a specified subband.

Figure 7:
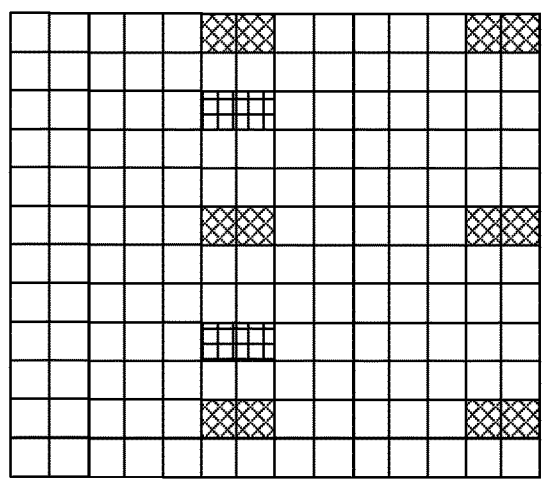
FIG. 7 is a schematic diagram showing that pilot signals are sent in a physical resource block PRB by using a first-category pilot port and a second-category pilot port according to Embodiment 4 of the present invention.
Figure 7:
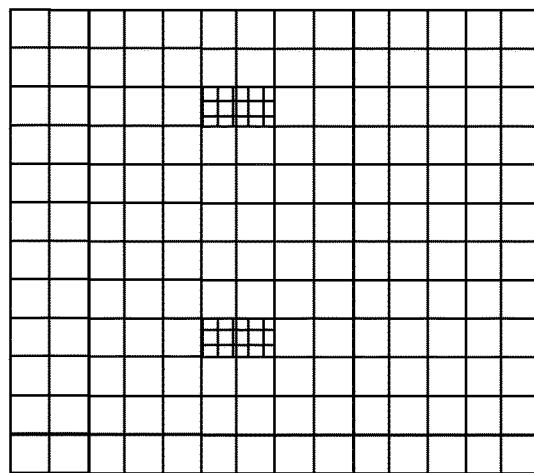
Figure 7:
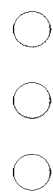
Figure 7:
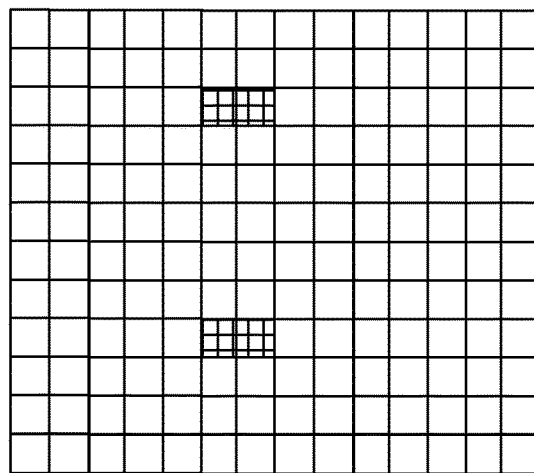

For example, a system bandwidth is 5 M, and a guard bandwidth is 0.5 M. A pilot signal is sent in a bandwidth of 4.5 M (5 M-0.5 M) by using the first-category pilot port, and a pilot signal is sent in a specified subband (for example, a subband determined the first time when the first information is determined) by using the second-category pilot port. As shown in FIG. 7, a large box represents a PRB, different PRBs correspond to different subbands, a square represents the first-category pilot port, a rhombus represents the second-category pilot port, and small boxes in the large box represent time frequency resources in the PRB. As can be seen from FIG. 7, a pilot signal is sent in each PRB included in a whole bandwidth by using the first-category pilot port, and a pilot signal is sent in only a particular subband, for example, in the first PRB, by using the second-category pilot port.

Optionally, the pilot port configuration information used to describe the first-category pilot port may include a group number of at least one group of pilot ports used by the first network device and a group number of at least one group of pilot ports used by the third network device.

Optionally, the pilot port configuration information used to describe the first-category pilot port may include a process number of a CSI process corresponding to at least one group of pilot ports used by the first network device and a process number of a CSI process corresponding to at least one group of pilot ports used by the third network device.

Preferably, the second-category pilot port may include a first pilot port for transmitting a first pilot signal and a second pilot port for transmitting a second pilot signal, and the first pilot signal and the second pilot signal are sent by the second network device by performing spatial multiplexing on a same time frequency resource. The first network device measures, by using the first pilot signal, a signal received by the first network device, the first network device measures, by using the second pilot signal, momentary interference to the signal received by the first network device, and the momentary interference is interference that is caused, because the third network device and the first network device perform spatial multiplexing on the same time frequency resource, to the signal received by the first network device.

For example, the DCI sent by the second network device is shown in Table 1.

TABLE 1

| Configuration information of the second-category pilot port | | | |
|---|---|---|---|
| One codeword | | Two codewords | |
| Status value | Information | Status value | Information |
| 0 | 1 layer (layer), port (port) 7, $n_{SCID} = 0$: first pilot port | 0 | 2 layer, port 7 to port 8, $n_{SCID} = 0$: first pilot port |

TABLE 1-continued

Configuration information of the second-category pilot port

| One codeword | | Two codewords | |
|---|---|---|---|
| Status value | Information | Status value | Information |
| | 1 layer, port 7, $n_{SCID} = 1$: second pilot port | | 2 layer, port 7 to port 8, $n_{SCID} = 1$: second pilot port |
| 1 | 1 layer, port 7, $n_{SCID} = 1$: first pilot port 1 layer, port 7, $n_{SCID} = 0$: second pilot port | 1 | 2 layer, port 7 to port 8, $n_{SCID} = 1$: first pilot port 2 layer, port 7 to port 8, $n_{SCID} = 0$: second pilot port |
| 2 | 1 layer, port 8, $n_{SCID} = 0$: first pilot port 1 layer, port 8, $n_{SCID} = 1$: second pilot port | 2 | 3 layer, port 7 to port 9 |
| 3 | 1 layer, port 8, $n_{SCID} = 1$: first pilot port 1 layer, port 8, $n_{SCID} = 0$: second pilot port | 3 | 4 layer, port 7 to port 10 |
| 4 | 2 layer, port 7 to port 8 | 4 | 5 layer, port 7 to port 11 |
| 5 | 3 layer, port 7 to port 9 | 5 | 6 layer, port 7 to port 12 |
| 6 | 4 layer, port 7 to port 10 | 6 | 7 layer, port 7 to port 13 |
| 7 | Reserved (reserved) | 7 | 8 layer, port 7 to port 14 |

Assuming that a "status value" in the pilot port configuration information is a state corresponding to 0, the first network device may determine that the RI used by the first network device is 1 (1 layer), the first pilot port is port 7 (port 7), an initialization ID of a pilot scrambling code sequence of the first pilot signal is 0 ($n_{SCID}=0$), the second pilot port is port 7 (port 7), and an initialization ID of a pilot scrambling code sequence of the second pilot signal is 1 ($n_{SCID}=1$). It is assumed that the momentary interference measured by using the second pilot signal is interference caused, because the third network device and the first network device perform spatial multiplexing on the same time frequency resource, to the signal that is measured by using the first pilot signal and that is received by the first network device.

Specifically, both the first pilot signal and the second pilot signal may be non-zero power pilot signals.

Specifically, the first pilot signal and a data signal that is sent by the second network device to the first network device may use a same precoding matrix, and the second pilot signal and a data signal that is sent by the second network device to the third network device may use a same precoding matrix.

Optionally, the first pilot signal may be a demodulation pilot signal of the data signal sent by the second network device to the first network device; or the second pilot signal may be a demodulation pilot signal of the data signal sent by the second network device to the third network device; or the first pilot signal may be a demodulation pilot signal of the data signal sent by the second network device to the first network device, and the second pilot signal may be a demodulation pilot signal of the data signal sent by the second network device to the third network device.

Specifically, the pilot port configuration information used to describe the second-category pilot port may include a port number of the pilot port used by the first network device and a port number of the pilot port used by the third network device.

Optionally, the pilot port configuration information used to describe the second-category pilot port may further include at least one of the subband for transmitting the pilot signal of the pilot port used by the first network device, a pilot sequence of the pilot signal of the pilot port used by the first network device, a transmit power of the pilot signal of the pilot port used by the first network device, the subband for transmitting the pilot signal of the pilot port used by the third network device, a pilot sequence of the pilot signal of the pilot port used by the third network device, or a transmit power of the pilot signal of the pilot port used by the third network device.

Step 402: A first network device measures, by using the first-category pilot port, a pilot signal sent by the second network device, and determines first information.

First information determined by means of measurement by using the first-category pilot port includes at least one of second information of the first network device or third information of a third network device when it is assumed that the first network device and the third network device communicate with the second network device by performing spatial multiplexing on the same time frequency resource. The second information includes at least one of information about the pilot port used by the first network device, an RI used by the first network device, a PMI used by the first network device, or a CQI. The third information includes at least one of information about the pilot port used by the third network device, an RI used by the third network device, a PMI used by the third network device, or a CQI.

Specifically, the second information in the first information determined by means of measurement by using the first-category pilot port may include the RI used by the first network device, the PMI used by the first network device, and the CQI, and the third information in the first information determined by means of measurement by using the first-category pilot port may include the RI used by the third network device and the PMI used by the third network device.

Specifically, the second information in the first information determined by means of measurement by using the first-category pilot port may include the PMI used by the first network device and the CQI, and the third information in the first information determined by means of measurement by using the first-category pilot port may include the PMI used by the third network device.

Specifically, the second information in the first information determined by means of measurement by using the first-category pilot port may include the PMI used by the first network device, and the third information in the first information determined by means of measurement by using the first-category pilot port may include the PMI used by the third network device. When the second network device sends only a pilot signal to the first network device and the third network device, the first information may not include the CQI.

Optionally, the second information in the first information determined by means of measurement by using the first-category pilot port may further include at least one of the subband for transmitting the pilot signal of the pilot port used by the first network device, the pilot sequence of the pilot signal of the pilot port used by the first network device, or the transmit power of the pilot signal of the pilot port used by the first network device, and the third information in the first information determined by means of measurement by using the first-category pilot port may further include at least one of the subband for transmitting the pilot signal of the pilot port used by the third network device, the pilot sequence of the pilot signal of the pilot port used by the third network device, or the transmit power of the pilot signal of the pilot port used by the third network device.

Specifically, step 402 may include:

measuring, by the first network device by using each first-category pilot port in at least one group of pilot ports, the pilot signal sent by the second network device, to obtain a channel coefficient corresponding to the first-category pilot port;

enabling channel coefficients corresponding to first-category pilot ports in each group of pilot ports to form a channel coefficient matrix corresponding to the group of pilot ports;

multiplying the channel coefficient matrix corresponding to each group of pilot ports by each precoding matrix in a precoding matrix set in one-to-one correspondence to the group of pilot ports, to obtain an equivalent channel coefficient matrix;

calculating an SINR when the first network device and the third network device use each equivalent channel coefficient matrix;

selecting a largest SINR from all calculated SINRs; and determining the first information for the first time according to the largest SINR, where the CQI is determined according to a specified correspondence between the SINR and the CQI, the information about the pilot port used by the first network device is information about a pilot port corresponding to an equivalent channel coefficient matrix used by the first network device when the largest SINR is calculated, the PMI used by the first network device is a PMI corresponding to the equivalent channel coefficient matrix used by the first network device when the largest SINR is calculated, the RI used by the first network device is a rank of a precoding matrix corresponding to the equivalent channel coefficient matrix used by the first network device, the information about the pilot port used by the third network device is information about a pilot port corresponding to an equivalent channel coefficient matrix used by the third network device when the largest SINR is calculated, the PMI used by the third network device is a PMI corresponding to the equivalent channel coefficient matrix used by the third network device when the largest SINR is calculated, and the RI used by the third network device is a rank of a precoding matrix corresponding to the equivalent channel coefficient matrix used by the third network device.

When the equivalent channel coefficient matrix is obtained, each group of pilot ports in M groups of pilot ports is traversed. When each group of pilot ports is traversed, each precoding matrix in a precoding matrix set corresponding to each group of pilot ports is traversed, and when each precoding matrix is traversed, a channel coefficient matrix corresponding to a group of traversed pilot port is multiplied by a traversed precoding matrix, to obtain an equivalent channel coefficient matrix. A specific traverse process is not described herein again.

Step 403: The first network device feeds back, to the second network device, the first information determined by means of measurement by using the first-category pilot port.

Step 404: The first network device measures, by using the second-category pilot port, a pilot signal sent by the second network device, and determines first information.

The first information determined by means of measurement by using the second-category pilot port may include the CQI.

Specifically, step 404 may include:

measuring, by the first network device separately by using a second-category pilot port used by the first network device and a second-category pilot port used by the third network device, the pilot signal sent by the second network device, to obtain an equivalent channel coefficient matrix used by the first network device and an equivalent channel coefficient matrix used by the third network device;

calculating an SINR when the first network device and the third network device communicate with the second network device on the same time frequency resource; and determine first information for the second time according to the calculated SINR, where the CQI is determined according to a specified correspondence between the SINR and the CQI.

In the configuration information of the second-category pilot port, the second network device separately designates one group of pilot ports or one pilot port for the first network device and the third network device. In addition, because the pilot signal of the second-category pilot port is precoded, an equivalent channel coefficient matrix or an equivalent channel coefficient may be directly obtained by means of measurement by using the second-category pilot port, and when the equivalent channel coefficient matrix is obtained, the groups of pilot ports and precoding matrices in the precoding matrix sets corresponding to the groups of pilot ports do not need to be traversed.

During specific implementation, the second network device may send the pilot signal of the first-category pilot port every first specified period, to switch, according to a change status of a channel, to a channel having good communication quality, to perform communication, thereby implementing self-adaptation of the system. For example, the first period is 5 ms, and the second network device sends the pilot signal of the first-category pilot port respectively at the $0^{th}$ ms, the $5^{th}$ ms, the $10^{th}$ ms, and the $15^{th}$ ms.

The second network device may send the pilot signal of the second-category pilot port when the second network device needs MU MIMO scheduling, to determine, for each scheduling, a channel having relatively good communication quality. If the second network device needs scheduling at the $13^{th}$ ms, the second network device sends the pilot signal of the second-category pilot port at the $13^{th}$ ms, or sends a port signal of the second-category pilot port within several subframes preceding the $13^{th}$ ms.

Specifically, the first information determined by means of measurement by using the first-category pilot port may be fed back to the second network device every second specified period, or may be fed back to the second network device in time each time after the first information is determined. The first information determined by means of measurement by using the second-category pilot port may be fed back to the second network device in time each time after the first information is determined.

In an implementation manner of this embodiment, the first information determined by means of measurement by using the first-category pilot port does not include a CQI when it is assumed that the first network device and the third network device communicate with the second network device by performing spatial multiplexing on the same time frequency resource, and the first information determined by means of measurement by using the second-category pilot port includes a CQI when it is assumed that the first network device and the third network device communicate with the second network device by performing spatial multiplexing on the same time frequency resource.

In another implementation manner of this embodiment, each of the first information determined by means of measurement by using the first-category pilot port and the first information determined by means of measurement by using the second-category pilot port includes a CQI when it is assumed that the first network device and the third network device communicate with the second network device by performing spatial multiplexing on the same time frequency resource, and the CQI in the first information determined by means of measurement by using the second-category pilot port is associated with the CQI in the first information determined by means of measurement by using the first-category pilot port.

Optionally, that the CQI in the first information determined by means of measurement by using the second-category pilot port is associated with the CQI in the first information determined by means of measurement by using the first-category pilot port includes that the CQI in the first information determined by means of measurement by using the second-category pilot port is obtained after difference is performed on the CQI in the first information determined by means of measurement by using the first-category pilot port.

For example, if the CQI determined by means of measurement by using the first-category pilot port is 10 dB, and the CQI determined by means of measurement by using the second-category pilot port is 15.2 dB, the CQI in the first information determined by means of measurement by using the second-category pilot port is a value obtained after 15.2−10=5.2 is quantized.

In an implementation manner of this embodiment, step 404 may include:

sending, by the second network device, a signal in a first time unit; and receiving, by the first network device, the signal sent by the second network device in the first time unit.

Figure 8A:
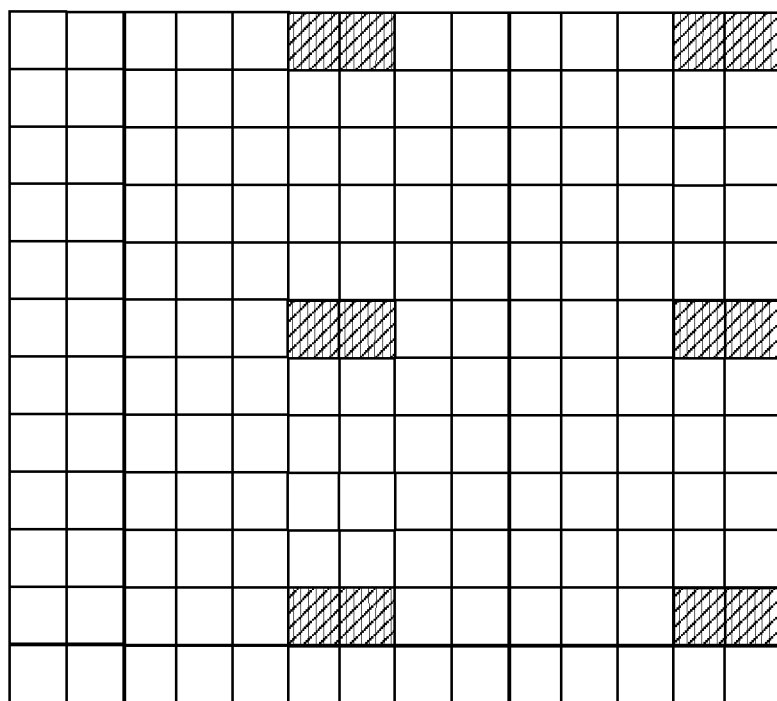
FIG. 8a to FIG. 8d are schematic diagrams showing that a second network device sends signals in a same PRB according to Embodiment 4 of the present invention.

The signal sent by the second network device in the first time unit includes the first pilot signal and the second pilot signal, and the signal sent by the second network device in the first time unit does not include the data signal that is sent to the first network device and whose demodulation pilot signal is the first pilot signal or the data signal that is sent to the third network device and whose demodulation pilot signal is the second pilot signal. The first pilot signal and the second pilot signal are sent by the second network device by performing spatial multiplexing on the same time frequency resource. The signal received by the first network device is measured at the first pilot port by using the first pilot signal, and the momentary interference to the signal received by the first network device is measured at the second pilot port by using the second pilot signal. As shown in FIG. 8a, a large box represents a PRB in the first time unit, small boxes in the large box represent time frequency resources in the PRB, slashes represent the first pilot signal, and vertical lines represent the second pilot signal. That is, a slashed small box represents that the first pilot signal is sent in the time frequency resource, and a small box having vertical lines represents that the second pilot signal is sent in the time frequency resource. As can be seen from FIG. 8a, the second network device sends the first pilot signal and the second pilot signal in the PRB, but does not send, in the PRB, the data signal that is sent to the first network device and whose demodulation pilot signal is the first pilot signal or the data signal that is sent to the third network device and whose demodulation pilot signal is the second pilot signal.

Specifically, the first time unit may be one timeslot, one subframe, or one radio frame.

In another implementation manner of this embodiment, step 404 may include:

sending, by the second network device, a signal in a first time unit; and receiving, by the first network device, the signal sent by the second network device in the first time unit.

Figure 8B:
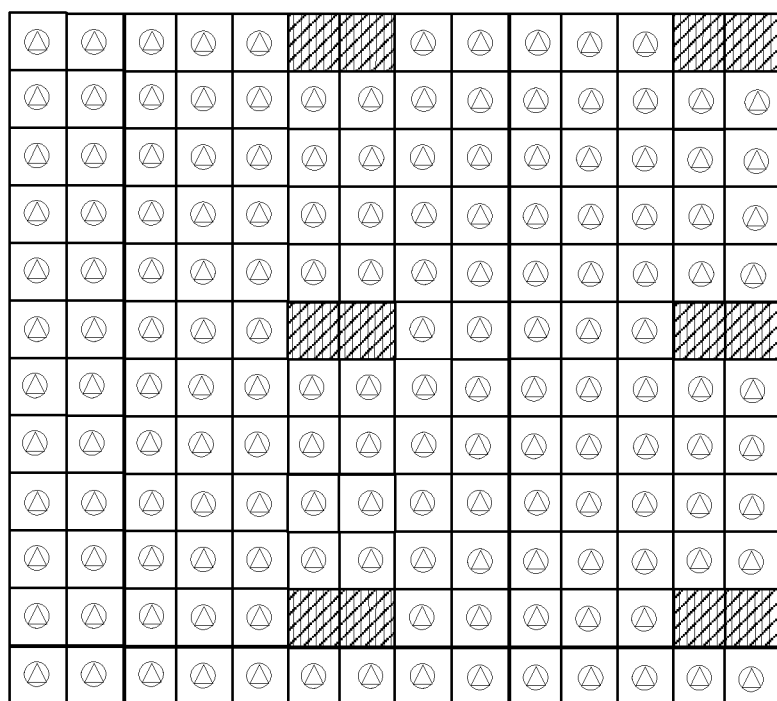

The signal sent by the second network device in the first time unit includes the first pilot signal, the second pilot signal, the data signal that is sent to the first network device and whose demodulation pilot signal is the first pilot signal, and the data signal that is sent to the third network device and whose demodulation pilot signal is the second pilot signal. The first pilot signal and the second pilot signal are sent by the second network device by performing spatial multiplexing on the same time frequency resource. The signal received by the first network device is measured at the first pilot port by using the first pilot signal, and the momentary interference to the signal received by the first network device is measured at the second pilot port by using the second pilot signal. As shown in FIG. 8b, a large box represents a PRB in the first time unit, small boxes in the large box represent time frequency resources in the PRB, slashes represent the first pilot signal, vertical lines represents the second pilot signal, a triangle represents the data signal that is sent to the first network device and whose demodulation pilot signal is the first pilot signal, and a circle represents the data signal that is sent to the third network device and whose demodulation pilot signal is the second pilot signal. That is, a slashed small box represents that the first pilot signal is sent in the time frequency resource, a small box having vertical lines represents that the second pilot signal is sent in the time frequency resource, a small box having the triangle represents that the data signal that is sent to the first network device and whose demodulation pilot signal is the first pilot signal is sent in the time frequency resource, and a small box having the circle represents that the data signal that is sent to the third network device and whose demodulation pilot signal is the second pilot signal is sent in the time frequency resource. As can be seen from FIG. 8b, the second network device sends, in the PRB, the first pilot signal, the second pilot signal, the data signal that is sent to the first network device and whose demodulation pilot signal is the first pilot signal, and the data signal that is sent to the third network device and whose demodulation pilot signal is the second pilot signal.

Specifically, the first time unit may be one timeslot, one subframe, or one radio frame.

In still another implementation manner of this embodiment, step 404 may include:

sending, by the second network device, a signal in a first time unit; and receiving, by the first network device, the signal sent by the second network device in the first time unit.

Figure 8C:
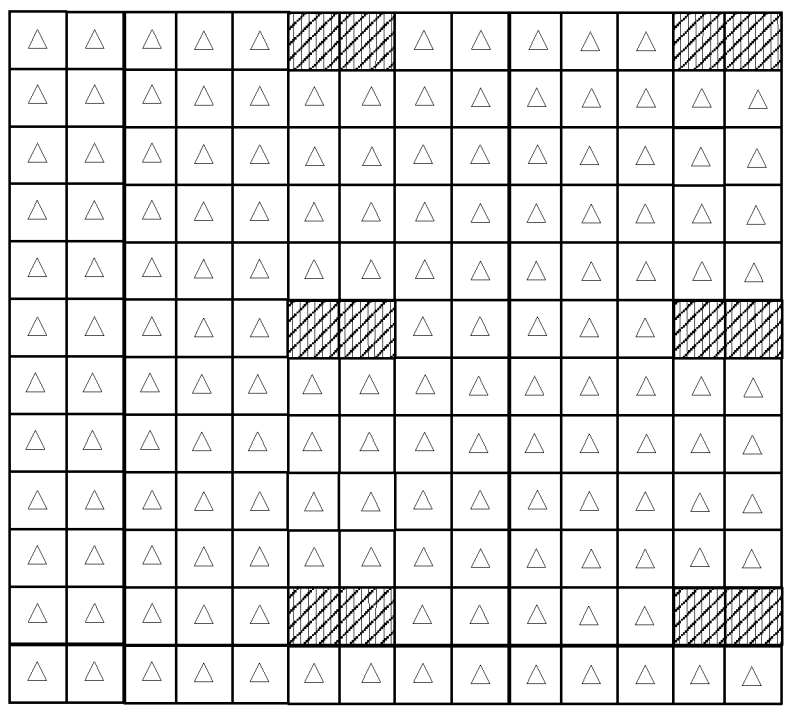

The signal sent by the second network device in the first time unit includes the first pilot signal, the second pilot signal, and the data signal that is sent to the first network device and whose demodulation pilot signal is the first pilot signal, and the signal sent by the second network device in the first time unit does not include the data signal that is sent to the third network device and whose demodulation pilot signal is the second pilot signal. The first pilot signal and the second pilot signal are sent by the second network device by performing spatial multiplexing on the same time frequency resource. The signal received by the first network device is measured at the first pilot port by using the first pilot signal, and the momentary interference to the signal received by the first network device is measured at the second pilot port by using the second pilot signal. As shown in FIG. 8*c*, a large box represents a PRB in the first time unit, small boxes in the large box represent time frequency resources in the PRB, slashes represent the first pilot signal, vertical lines represent the second pilot signal, and a triangle represents the data signal that is sent to the first network device and whose demodulation pilot signal is the first pilot signal. That is, a slashed small box represents that the first pilot signal is sent in the time frequency resource, a small box having vertical lines represents that the second pilot signal is sent in the time frequency resource, and a small box having the triangle represents that the data signal that is sent to the first network device and whose demodulation pilot signal is the first pilot signal is sent in the time frequency resource. As can be seen from FIG. 8*c*, the second network device sends, in the PRB, the first pilot signal, the second pilot signal, and the data signal that is sent to the first network device and whose demodulation pilot signal is the first pilot signal, but does not send, in the PRB, the data signal that is sent to the third network device and whose demodulation pilot signal is the second pilot signal.

Specifically, the first time unit may be one timeslot, one subframe, or one radio frame.

In still another implementation manner of this embodiment, step 404 may include:

sending, by the second network device, a signal in a first time unit; and receiving, by the first network device, the signal sent by the second network device in the first time unit.

Figure 8D:
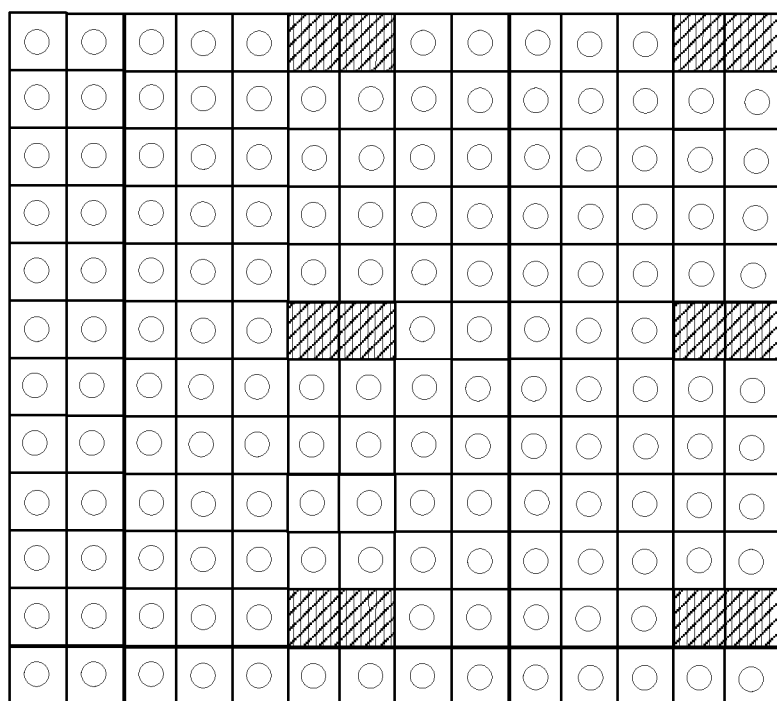

The signal sent by the second network device in the first time unit includes the first pilot signal, the second pilot signal, and the data signal that is sent to the third network device and whose demodulation pilot signal is the second pilot signal, and the signal sent by the second network device in the first time unit does not include the data signal that is sent to the first network device and whose demodulation pilot signal is the first pilot signal. The first pilot signal and the second pilot signal are sent by the second network device by performing spatial multiplexing on the same time frequency resource. The signal received by the first network device is measured at the first pilot port by using the first pilot signal, and the momentary interference to the signal received by the first network device is measured at the second pilot port by using the second pilot signal. As shown in FIG. 8*d*, a large box represents a PRB in the first time unit, small boxes in the large box represent time frequency resources in the PRB, slashes represent the first pilot signal, vertical lines represent the second pilot signal, and a circle represents the data signal that is sent to the third network device and whose demodulation pilot signal is the second pilot signal. That is, a slashed small box represents that the first pilot signal is sent in the time frequency resource, a small box having vertical lines represents that the second pilot signal is sent in the time frequency resource, and a small box having the circle represents that the data signal that is sent to the third network device and whose demodulation pilot signal is the second pilot signal is sent in the time frequency resource. As can be seen from FIG. 8*d*, the second network device sends, in the PRB, the first pilot signal, the second pilot signal, and the data signal that is sent to the third network device and whose demodulation pilot signal is the second pilot signal, but does not send, in the PRB, the data signal that is sent to the first network device and whose demodulation pilot signal is the first pilot signal.

Specifically, the first time unit may be one timeslot, one subframe, or one radio frame.

Step 405: The first network device feeds back, to the second network device, the first information determined by means of measurement by using the second-category pilot port.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 5

Figure 9:
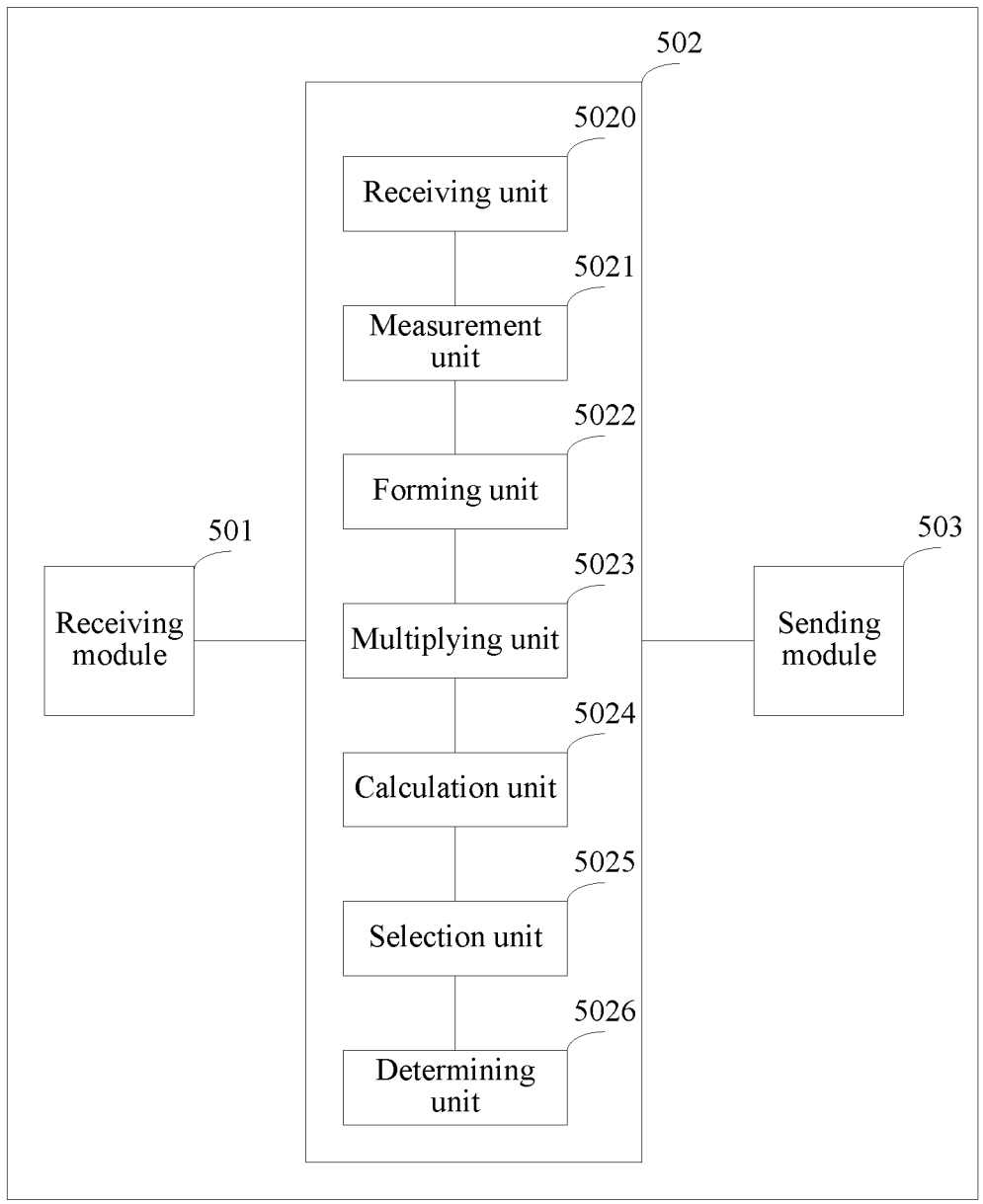
FIG. 9 is a schematic structural diagram of a first network device according to Embodiment 5 of the present invention.

This embodiment of the present invention provides a first network device. The first network device is the first network device described in any one of Embodiment 1 to Embodiment 4. Referring to FIG. 9, the first network device includes:

a receiving module 501, configured to receive pilot port configuration information sent by a second network device, where the pilot port configuration information is used to describe at least two pilot ports;

a determining module 502, configured to: measure, by using the at least two pilot ports, a pilot signal sent by the second network device, and determine first information, where the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, an RI used by the first network device, a PMI used by the first network device, or a CQI, and the third information includes at least one of information about a pilot port used by the third network device, an RI used by the third network device, a PMI used by the third network device, or a CQI; and a sending module 503, configured to feed back the first information to the second network device.

In an actual application, the receiving module 501 may be implemented by using a receiver, the determining module 502 may be implemented by using a processor, and the sending module 503 may be implemented by using a transmitter.

It should be noted that, that the first network device and the third network device communicate with the second network device by performing spatial multiplexing on the same time frequency resource refers to: The first network device and the third network device communicate with the second network device by performing spatial multiplexing in a same PRB. The first network device is first UE, the third network device is second UE, and the second network device is a base station; or the first network device is a first secondary base station, the third network device is a second secondary base station, and the second network device is a primary base station; or the first network device is first secondary UE, the third network device is second secondary UE, and the second network device is primary UE. There may be one or more third network devices that perform spatial multiplexing on the same time frequency resource and communicate with the second network device as the first network device does. After receiving the first information, the second network device may configure, according to the first information, scheduling information when the first network device and the third network device communicate with the second network device by performing spatial multiplexing on the same time frequency resource, so that the scheduling information is more accurate. For details, refer to Embodiment 1 or Embodiment 2.

Specifically, content included in the pilot port configuration information may be the same as that in any one of Embodiment 1 to Embodiment 4, and details are not described herein again.

In an implementation manner of this embodiment, the at least two pilot ports may be one group of pilot ports or at least two groups of pilot ports. For details, refer to step 301 in Embodiment 3, and details are not described herein again.

In another implementation manner of this embodiment, the determining module 502 may include:

a measurement unit 5021, configured to measure, by using each pilot port in the one group of pilot ports or the at least two groups of pilot ports, the pilot signal sent by the second network device, to obtain a channel coefficient corresponding to the pilot port;

a forming unit 5022, configured to enable channel coefficients corresponding to pilot ports in each group of pilot ports to form a channel coefficient matrix corresponding to the group of pilot ports;

a multiplying unit 5023, configured to multiply the channel coefficient matrix corresponding to each group of pilot ports by each precoding matrix in a precoding matrix set corresponding to each group of pilot ports, to obtain an equivalent channel coefficient matrix;

a calculation unit 5024, configured to calculate an SINR when the first network device and the third network device use each equivalent channel coefficient matrix;

a selection unit 5025, configured to select a largest SINR in all calculated SINRs; and a determining unit 5026, configured to determine the first information according to the largest SINR, where the CQI is determined according to a specified correspondence between the SINR and the CQI, the information about the pilot port used by the first network device is information about a pilot port corresponding to an equivalent channel coefficient matrix used by the first network device when the largest SINR is calculated, the PMI used by the first network device is a PMI corresponding to the equivalent channel coefficient matrix used by the first network device when the largest SINR is calculated, the RI used by the first network device is a rank of a precoding matrix corresponding to the equivalent channel coefficient matrix used by the first network device when the largest SINR is calculated, the information about the pilot port used by the third network device is information about a pilot port corresponding to an equivalent channel coefficient matrix used by the third network device when the largest SINR is calculated, the PMI used by the third network device is a PMI corresponding to the equivalent channel coefficient matrix used by the third network device when the largest SINR is calculated, and the RI used by the third network device is a rank of a precoding matrix corresponding to the equivalent channel coefficient matrix used by the third network device when the largest SINR is calculated.

In an actual application, the measurement unit 5021, the forming unit 5022, the multiplying unit 5023, the calculation unit 5024, the selection unit 5025, and the determining unit 5026 may be implemented by using different processors, or may be implemented by using a same processor. For how the measurement unit 5021, the forming unit 5022, the multiplying unit 5023, the calculation unit 5024, the selection unit 5025, and the determining unit 5026 specifically determine the first information, refer to Embodiment 3.

In still another implementation manner of this embodiment, the information about the pilot port used by the first network device may further include at least one of a subband for transmitting a pilot signal of the pilot port used by the first network device, a pilot sequence of the pilot signal of the pilot port used by the first network device, or a transmit power of the pilot signal of the pilot port used by the first network device, and the information about the pilot port used by the third network device may further include at least one of a subband for transmitting a pilot signal of the pilot port used by the third network device, a pilot sequence of the pilot signal of the pilot port used by the third network device, or a transmit power of the pilot signal of the pilot port used by the third network device.

Specifically, the receiving module 501 may be configured to:

receive DCI sent by the second network device, where the DCI includes the pilot port configuration information.

In still another implementation manner of this embodiment, the at least two pilot ports may include a first-category pilot port and a second-category pilot port. For details, refer to step 401 in Embodiment 4, and details are not described herein again.

Optionally, the determining module 502 may include:

a receiving unit 5020, configured to receive a signal that is sent by the second network device in a first time unit.

The signal sent by the second network device in the first time unit may include a first pilot signal and a second pilot signal, and the signal sent by the second network device in the first time unit does not include a data signal that is sent to the first network device and whose demodulation pilot signal is the first pilot signal or a data signal that is sent to the third network device and whose demodulation pilot signal is the second pilot signal; or the signal sent by the second network device in the first time unit may include a first pilot signal, a second pilot signal, a data signal that is sent to the first network device and whose demodulation pilot signal is the first pilot signal, and a data signal that is sent to the third network device and whose demodulation pilot signal is the second pilot signal; or the signal sent by the second network device in the first time unit may include a first pilot signal, a second pilot signal, and a data signal that is sent to the first network device and whose demodulation pilot signal is the first pilot signal, and the signal sent by the second network device in the first time unit does not include a data signal that is sent to the third network device and whose demodulation pilot signal is the second pilot signal; or the signal sent by the second network device in the first time unit may include a first pilot signal, a second pilot signal, and a data signal that is sent to the third network device and whose demodulation pilot signal is the second pilot signal, and the signal sent by the second network device in the first time unit does not include a data signal that is sent to the first network device and whose demodulation pilot signal is the first pilot signal. For details, refer to step 404 and FIG. 8*a* to FIG. 8*d* in Embodiment 4, and details are not described herein again.

Specifically, the first time unit may be one timeslot, one subframe, or one radio frame.

In an actual application, the receiving unit 5020 may be implemented by using a receiver.

Specifically, the determining module 502 may include:

a first determining submodule, configured to: measure, by using the first-category pilot port, the pilot signal sent by the second network device, and determine first information; and a second determining submodule, configured to: measure, by using the second-category pilot port, the pilot signal sent by the second network device, and determine first information.

Correspondingly, the sending module 503 may include:

a first feedback submodule, configured to feed back, to the second network device, the first information determined by means of measurement by using the first-category pilot port; and a second feedback submodule, configured to feed back, to the second network device, the first information determined by means of measurement by using the second-category pilot port.

More specifically, both the first determining submodule and the second determining submodule may include the measurement unit 5021, the forming unit 5022, the multiplying unit 5023, the calculation unit 5024, the selection unit 5025, and the determining unit 5026.

Specifically, the receiving module 501 may be configured to:

receive the DCI sent by the second network device, where the DCI includes pilot port configuration information used to describe the first-category pilot port or pilot port configuration information used to describe the second-category pilot port.

Further, for a sending module of the first-category pilot port, a sending mode of the second-category pilot port, the pilot port configuration information of the first-category pilot port, the configuration information of the second-category pilot port, a structure of the second-category pilot port, a feedback mode of the first information determined by means of measurement by using the first-category pilot port, and a feedback mode of the first information determined by means of measurement by using the second-category pilot port, refer to step 401 in Embodiment 4, and details are not described herein again.

In an implementation manner of this embodiment, a relationship between the first information determined by means of measurement by using the first-category pilot port and the first information determined by means of measurement by using the second-category pilot port may be the same as that in Embodiment 4, and details are not described herein again.

In still another implementation manner of this embodiment, feedback modes of the second information and the third information may be the same as those in step 303 in Embodiment 3, and details are not described herein again.

In still another implementation manner of this embodiment, feedback periods of the second information and the third information may be the same as those in step 303 in Embodiment 3, and details are not described herein again.

In still another possible implementation manner of the this embodiment, the first information may further include fourth information of the first network device when it is assumed that the first network device and the second network device perform SU-MIMO communication, and the fourth information includes at least one of configuration information of a pilot port used by the first network device, an RI used by the first network device, a PMI used by the first network device, or a CQI.

Optionally, when the first information includes the second information, the third information, and the fourth information, if a sum of information amounts of the second information, the third information, and the fourth information is greater than a largest amount of information transmitted by the first network device, the fourth information may be discarded preferentially to the third information, and the third information may be discarded preferentially to the second information; or the fourth information may be discarded preferentially to the second information, and the second information may be discarded preferentially to the third information; or the second information may be discarded preferentially to the third information, and the third information may be discarded preferentially to the fourth information; or the second information may be discarded preferentially to the fourth information, and the fourth information may be discarded preferentially to the third information; or the third information may be discarded preferentially to the second information, and the second information may be discarded preferentially to the fourth information; or the third information may be discarded preferentially to the fourth information, and the fourth information may be discarded preferentially to the second information.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 6

Figure 10:
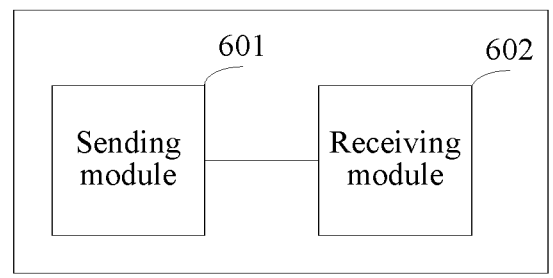
FIG. 10 is a schematic structural diagram of a second network device according to Embodiment 6 of the present invention.

This embodiment of the present invention provides a second network device. The second network device is the second network device described in any one of Embodiment 1 to Embodiment 4. Referring to FIG. 10, the second network device includes:

a sending module 601, configured to send pilot port configuration information, where the pilot port configuration information is used to describe at least two pilot ports; and a receiving module 602, configured to receive first information fed back by a first network device, where the first information is determined by the first network device by measuring, by using the at least two pilot ports, a pilot signal sent by the second network device, the first information includes at least one of second information of the first network device or third information of a third network device when it is assumed that the first network device and the third network device communicate with the second network device by performing spatial multiplexing on a same time frequency resource, the second information includes at least one of information about a pilot port used by the first network device, an RI used by the first network device, a PMI used by the first network device, or a CQI, and the third information includes at least one of information about a pilot port used by the third network device, an RI used by the third network device, a PMI used by the third network device, or a CQI.

In an actual application, the sending module 601 may be implemented by using a transmitter, and the receiving module 602 may be implemented by using a receiver.

It should be noted that, that the first network device and the third network device communicate with the second network device by performing spatial multiplexing on the same time frequency resource refers to: The first network device and the third network device communicate with the second network device by performing spatial multiplexing in a same PRB. The first network device is first UE, the third network device is second UE, and the second network device is a base station; or the first network device is a first secondary base station, the third network device is a second secondary base station, and the second network device is a primary base station; or the first network device is first secondary UE, the third network device is second secondary UE, and the second network device is primary UE. There may be one or more third network devices that perform spatial multiplexing on the same time frequency resource and communicate with the second network device as the first network device does. After receiving the first information, the second network device may configure, according to the first information, scheduling information when the first network device and the third network device communicate with the second network device by performing spatial multiplexing on the same time frequency resource, so that the scheduling information is more accurate. For details, refer to Embodiment 1 or Embodiment 2.

Specifically, content included in the pilot port configuration information may be the same as that in any one of Embodiment 1 to Embodiment 4, and details are not described herein again.

In an implementation manner of this embodiment, the at least two pilot ports may be one group of pilot ports or at least two groups of pilot ports. For details, refer to step 301 in Embodiment 3, and details are not described herein again.

Specifically, the sending module 601 may be configured to:

send DCI, where the DCI includes the pilot port configuration information.

In still another implementation manner of this embodiment, the at least two pilot ports may include a first-category pilot port and a second-category pilot port. For details, refer to step 401 in Embodiment 4, and details are not described herein again.

Optionally, the sending module 601 may be further configured to:

send a signal in a first time unit.

The signal sent in the first time unit may include a first pilot signal and a second pilot signal, and the signal in the first time unit does not include a data signal that is sent to the first network device and whose demodulation pilot signal is the first pilot signal or a data signal that is sent to the third network device and whose demodulation pilot signal is the second pilot signal; or the signal sent in the first time unit may include a first pilot signal, a second pilot signal, a data signal that is sent to the first network device and whose demodulation pilot signal is the first pilot signal, and a data signal that is sent to the third network device and whose demodulation pilot signal is the second pilot signal; or the signal sent in the first time unit may include a first pilot signal, a second pilot signal, and a data signal that is sent to the first network device and whose demodulation pilot signal is the first pilot signal, and the signal sent in the first time unit does not include a data signal that is sent to the third network device and whose demodulation pilot signal is the second pilot signal; or the signal sent in the first time unit may include a first pilot signal, a second pilot signal, and a data signal that is sent to the third network device and whose demodulation pilot signal is the second pilot signal, and the signal sent in the first time unit does not include a data signal that is sent to the first network device and whose demodulation pilot signal is the first pilot signal. For details, refer to step 404 and FIG. 8*a* to FIG. 8*d* in Embodiment 4, and details are not described herein again.

Specifically, the first time unit may be one timeslot, one subframe, or one radio frame.

Specifically, the receiving module 602 may be configured to:

receive first information determined by measuring, by using the first-category pilot port, the pilot signal sent by the second network device; and receive first information determined by measuring, by using the second-category pilot port, the pilot signal sent by the second network device.

Specifically, the sending module 601 may be configured to:

send DCI, where the DCI includes pilot port configuration information used to describe the first-category pilot port or pilot port configuration information used to describe the second-category pilot port.

Further, for a sending module of the first-category pilot port, a sending mode of the second-category pilot port, the pilot port configuration information of the first-category pilot port, the configuration information of the second-category pilot port, a structure of the second-category pilot port, a feedback mode of the first information determined by means of measurement by using the first-category pilot port, and a feedback mode of the first information determined by means of measurement by using the second-category pilot port, refer to step 401 in Embodiment 4, and details are not described herein again.

In an implementation manner of this embodiment, a relationship between the first information determined by means of measurement by using the first-category pilot port and the first information determined by means of measurement by using the second-category pilot port may be the same as that in Embodiment 4, and details are not described herein again.

In still another implementation manner of this embodiment, feedback modes of the second information and the third information may be the same as those in step 303 in Embodiment 3, and details are not described herein again.

In still another implementation manner of this embodiment, feedback periods of the second information and the third information may be the same as those in step 303 in Embodiment 3, and details are not described herein again.

In still another possible implementation manner of the this embodiment, the first information may further include fourth information of the first network device when it is assumed that the first network device and the second network device perform SU-MIMO communication, and the fourth information includes at least one of configuration information of a pilot port used by the first network device, an RI used by the first network device, a PMI used by the first network device, or a CQI.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

Embodiment 7

Figure 11:
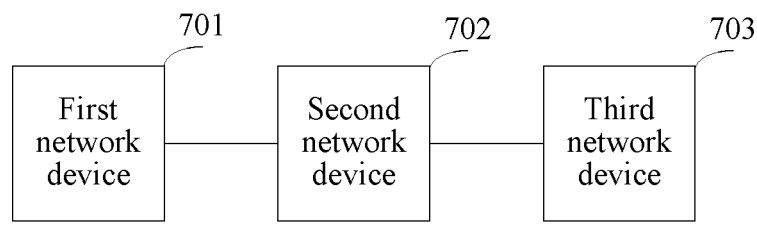
FIG. 11 is a schematic structural diagram of a channel measurement and feedback system according to Embodiment 7 of the present invention.

This embodiment of the present invention provides a channel measurement and feedback system. Referring to FIG. 11, the system includes a first network device 701, a second network device 702, and a third network device 703. The first network device 701, the second network device 702, and the third network device 703 respectively are the first network device, the second network device, and the third network device described in any one of Embodiment 1 to Embodiment 4.

In an actual application, in a first case, the first network device 701 is first UE (UE 1 shown in FIG. 1), the third network device 703 is second UE (UE 3 shown in FIG. 1), the second network device 702 is a base station (base station 2 shown in FIG. 1), the base station controls communication of the first UE and communication of the second UE, and there is no primary-secondary relationship between the first UE and the second UE. In a second case, the first network device 701 is a first secondary base station, the third network device 703 is a second secondary base station, the second network device 702 is a primary base station, and the primary base station controls communication of the first secondary base station and communication of the second secondary base station. For example, the primary base station is a macro base station, the first secondary base station is a micro base station, and the second secondary base station is another micro base station. In a third case, the first network device 701 is first secondary UE, the third network device 703 is second secondary UE, the second network device 702 is primary UE, and the primary UE controls communication of the first secondary UE and communication of the second secondary UE.

In this embodiment of the present invention, a pilot signal sent by a second network device is measured by using at least two pilot ports, and first information is determined, where the first information includes at least one of second information of a first network device or third information of a third network device when it is assumed that the first network device and the third network device communicate with the second network device by performing spatial multiplexing on a same time frequency resource. Therefore, interference caused by the third network device to the first network device when the first network device and third network device communicate with the second network device by performing spatial multiplexing on the same time frequency resource is considered adequately, thereby improving accuracy of channel measurement and accuracy of a measurement result received by the second network device, and further increasing rationality of configuration by the second network device on the first network device and the third network device.

It should be noted that: when the network device provided in the foregoing embodiments performs channel measurement and feedback, divisions of the foregoing function modules are used as an example for description. In an actual application, the foregoing functions can be allocated to different function modules and implemented according to a requirement, that is, an inner structure of the device is divided into different function modules to implement all or some of the functions described above. Besides, the network device provided in the foregoing embodiment and the embodiment of the channel measurement and feedback method belong to a same concept. For a specific implementation process, refer to the method embodiment, and details are not described herein again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A channel measurement and feedback method, wherein the method comprises:

receiving, by a first network device, a pilot port configuration information sent by a second network device, wherein the pilot port configuration information describes at least two pilot ports;

measuring, by using the at least two pilot ports, a pilot signal sent by the second network device, and determining a first information, wherein the first information comprises a second information of the first network device when it is assumed that the first network device and a third network device communicate with the second network device by performing spatial multiplexing on a same time-frequency resource, wherein the second information comprises at least one of:
an information about a pilot port used by the first network device,
a rank indication (RI) used by the first network device,
a precoding matrix indicator (PMI) used by the first network device, or
a channel quality indicator (CQI); and
feeding back the first information to the second network device.

2. The method according to claim 1, wherein the first information comprises a third information of the third network device, and the third information comprises at least one of:
an information about a pilot port used by the third network device,
an RI used by the third network device,
a PMI used by the third network device, or
a CQI.

3. The method according to claim 2, wherein the at least two pilot ports are one group of pilot ports or at least two groups of pilot ports, wherein each group of pilot ports is described by using independently configured pilot port configuration information, and wherein one group of pilot ports comprises at least one pilot port.

4. The method according to claim 3,
wherein the at least two pilot ports are the one group of pilot ports, and
the information about the pilot port used by the first network device in the second information comprises a port number of at least one pilot port selected by the first network device for the first network device in the one group of pilot ports, and the information about the pilot port used by the third network device in the third information comprises a port number of at least one pilot port selected by the first network device for the third network device in the one group of pilot ports.

5. The method according to claim 3, wherein the independently configured pilot port configuration information is in one-to-one correspondence to a configuration information of a channel state information (CSI) process, and wherein configuration information of each CSI process comprises configuration information of a non-zero power channel state information-reference signal (CSI-RS) and configuration information of a channel state information interference measurement (CSI-IM) reference signal.

6. The method according to claim 5,
wherein the at least two pilot ports are the at least two groups of pilot ports, and
the information about the pilot port used by the first network device in the first information comprises a process number of a CSI process corresponding to at least one group of pilot ports selected by the first network device for the first network device in the at least two groups of pilot ports, and the information about the pilot port used by the third network device in the third information comprises a process number of a CSI process corresponding to at least one group of pilot ports selected by the first network device for the third network device in the at least two groups of pilot ports.

7. The method according to claim 1, wherein the information about the pilot port used by the first network device further comprises at least one of:
a subband for transmitting a pilot signal of the pilot port used by the first network device,
a pilot sequence of the pilot signal of the pilot port used by the first network device, or
a transmit power of the pilot signal of the pilot port used by the first network device; and
the information about the pilot port used by the third network device further comprises at least one of:
a subband for transmitting a pilot signal of the pilot port used by the third network device,
a pilot sequence of the pilot signal of the pilot port used by the third network device, or
a transmit power of the pilot signal of the pilot port used by the third network device.

8. A first network device, wherein the first network device comprises:
a receiving module, configured to receive a pilot port configuration information sent by a second network device, wherein the pilot port configuration information describes an at least two pilot ports;
a determining module, configured to:
measure, by using the at least two pilot ports, a pilot signal sent by the second network device, and
determine a first information,
wherein the first information comprises a second information of the first network device when it is assumed that the first network device and a third network device communicate with the second network device by performing spatial multiplexing on a same time-frequency resource, and
wherein the second information comprises at least one of:
an information about a pilot port used by the first network device,
a rank indication (RI) used by the first network device,
a precoding matrix indicator (PMI) used by the first network device, or
a channel quality indicator (CQI); and
a sending module, configured to feed back the first information to the second network device.

9. The first network device according to claim 8, wherein the first information comprises the third information of the third network device, and the third information comprises at least one of:
an information about a pilot port used by the third network device,
an RI used by the third network device,
a PMI used by the third network device, or
a CQI.

10. The first network device according to claim 9, wherein the at least two pilot ports are one group of pilot ports or at least two groups of pilot ports, each group of pilot ports is described by using independently configured pilot port configuration information, and one group of pilot ports comprises at least one pilot port.

11. The first network device according to claim 10,
wherein the at least two pilot ports are the one group of pilot ports, and
the information about the pilot port used by the first network device in the second information comprises a port number of at least one pilot port selected by the first network device for the first network device in the one group of pilot ports, and the information about the pilot port used by the third network device in the third information comprises a port number of at least one pilot port selected by the first network device for the third network device in the one group of pilot ports.

12. The first network device according to claim 10, wherein the independently configured pilot port configuration information is in one-to-one correspondence to configuration information of a channel state information (CSI) process, and configuration information of each CSI process comprises configuration information of a non-zero power channel state information-reference signal (CSI-RS) and configuration information of a channel state information interference measurement (CSI-IM) reference signal.

13. The first network device according to claim 12,
wherein the at least two pilot ports are the at least two groups of pilot ports, and
the information about the pilot port used by the first network device in the first information comprises a process number of a CSI process corresponding to at least one group of pilot ports selected by the first network device for the first network device in the at least two groups of pilot ports, and the information about the pilot port used by the third network device in the third information comprises a process number of a CSI process corresponding to at least one group of pilot ports selected by the first network device for the third network device in the at least two groups of pilot ports.

14. The first network device according to claim 13, wherein the information about the pilot port used by the first network device further comprises at least one of:
a subband for transmitting a pilot signal of the pilot port used by the first network device,
a pilot sequence of the pilot signal of the pilot port used by the first network device, or
a transmit power of the pilot signal of the pilot port used by the first network device; and
the information about the pilot port used by the third network device further comprises at least one of:
a subband for transmitting a pilot signal of the pilot port used by the third network device,
a pilot sequence of the pilot signal of the pilot port used by the third network device, or
a transmit power of the pilot signal of the pilot port used by the third network device.

15. A channel measurement and feedback system, wherein the system comprises:
a first network device, a second network device, and a third network device,
wherein the first network device comprises:
a receiving module, configured to receive a pilot port configuration information sent by a second network device, wherein the pilot port configuration information describes an at least two pilot ports;
a determining module, configured to:
measure, by using the at least two pilot ports, a pilot signal sent by the second network device, and determine a first information,
wherein the first information comprises a second information of the first network device when it is assumed that the first network device and a third network device communicate with the second network device by performing spatial multiplexing on a same time-frequency resource, and
wherein the second information comprises at least one of:
an information about a pilot port used by the first network device,
a rank indication (RI) used by the first network device,
a precoding matrix indicator (PMI) used by the first network device, or
a channel quality indicator (CQI); and
a sending module, configured to feed back the first information to the second network device.

16. The method according to claim 3,
wherein the at least two pilot ports are the at least two groups of pilot ports, and
the information about the pilot port used by the first network device in the first information comprises a group number of at least one group of pilot ports selected by the first network device for the first network device in the at least two groups of pilot ports, and the information about the pilot port used by the third network device in the third information comprises a group number of at least one group of pilot ports selected by the first network device for the third network device in the at least two groups of pilot ports.

17. The first network device according to claim 10,
wherein the at least two pilot ports are the at least two groups of pilot ports, and
the information about the pilot port used by the first network device in the first information comprises a group number of at least one group of pilot ports selected by the first network device for the first network device in the at least two groups of pilot ports, and the information about the pilot port used by the third network device in the third information comprises a group number of at least one group of pilot ports selected by the first network device for the third network device in the at least two groups of pilot ports.

* * * * *